(12) United States Patent
Pierce

(10) Patent No.: US 9,003,297 B2
(45) Date of Patent: Apr. 7, 2015

(54) INTEGRATED ENTERPRISE SOFTWARE AND SOCIAL NETWORK SYSTEM USER INTERFACES UTILIZING CLOUD COMPUTING INFRASTRUCTURES AND SINGLE SECURE PORTAL ACCESS

(75) Inventor: Douglas Pierce, Wildwood, MO (US)

(73) Assignee: Mworks Worldwide, Inc., St. Louis, MO (US)

( * ) Notice: Subject to any disclaimer, the term of this patent is extended or adjusted under 35 U.S.C. 154(b) by 573 days.

(21) Appl. No.: 13/347,402

(22) Filed: Jan. 10, 2012

(65) Prior Publication Data

US 2012/0216125 A1 Aug. 23, 2012

Related U.S. Application Data

(60) Provisional application No. 61/444,020, filed on Feb. 17, 2011.

(51) Int. Cl.
*G06F 3/01* (2006.01)
*G06F 15/16* (2006.01)
*G06Q 10/10* (2012.01)

(52) U.S. Cl.
CPC .................. *G06Q 10/103* (2013.01)

(58) Field of Classification Search
USPC ......................................................... 715/744
See application file for complete search history.

(56) References Cited

U.S. PATENT DOCUMENTS 8,407,576 B1* 3/2013 Yin et al. ...................... 715/206
2009/0271724 A1* 10/2009 Chaudhri et al. ............. 715/769

* cited by examiner

*Primary Examiner* — Peiyong Weng
(74) *Attorney, Agent, or Firm* — Lewis Rice LLC

(57) ABSTRACT

A software-based method and system to provide a secure user interface on multiple and diverse electronic computing devices with a customized and secure dashboard feature. The systems and methods simultaneously integrate internally generated software utilities of an enterprise with externally accessed software operating in a 'cloud computing' environment. The systems and methods can be used in management and operations that use computer based software, data management, creative processes and communication systems. The systems and methods reduce the requirement for additional programming to integrate or interchange equivalent and independently developed software for use within an enterprise. The systems and methods permit social network communications between members of an enterprise and an external community. The security features of the user interface portal permit collaborations between parties in an external community and enterprise members that can develop new processes that remain proprietary to the enterprise and parties of an external community.

10 Claims, 24 Drawing Sheets

Invention Overview Illustrating SSO/SAML Features with Unified Search Utility

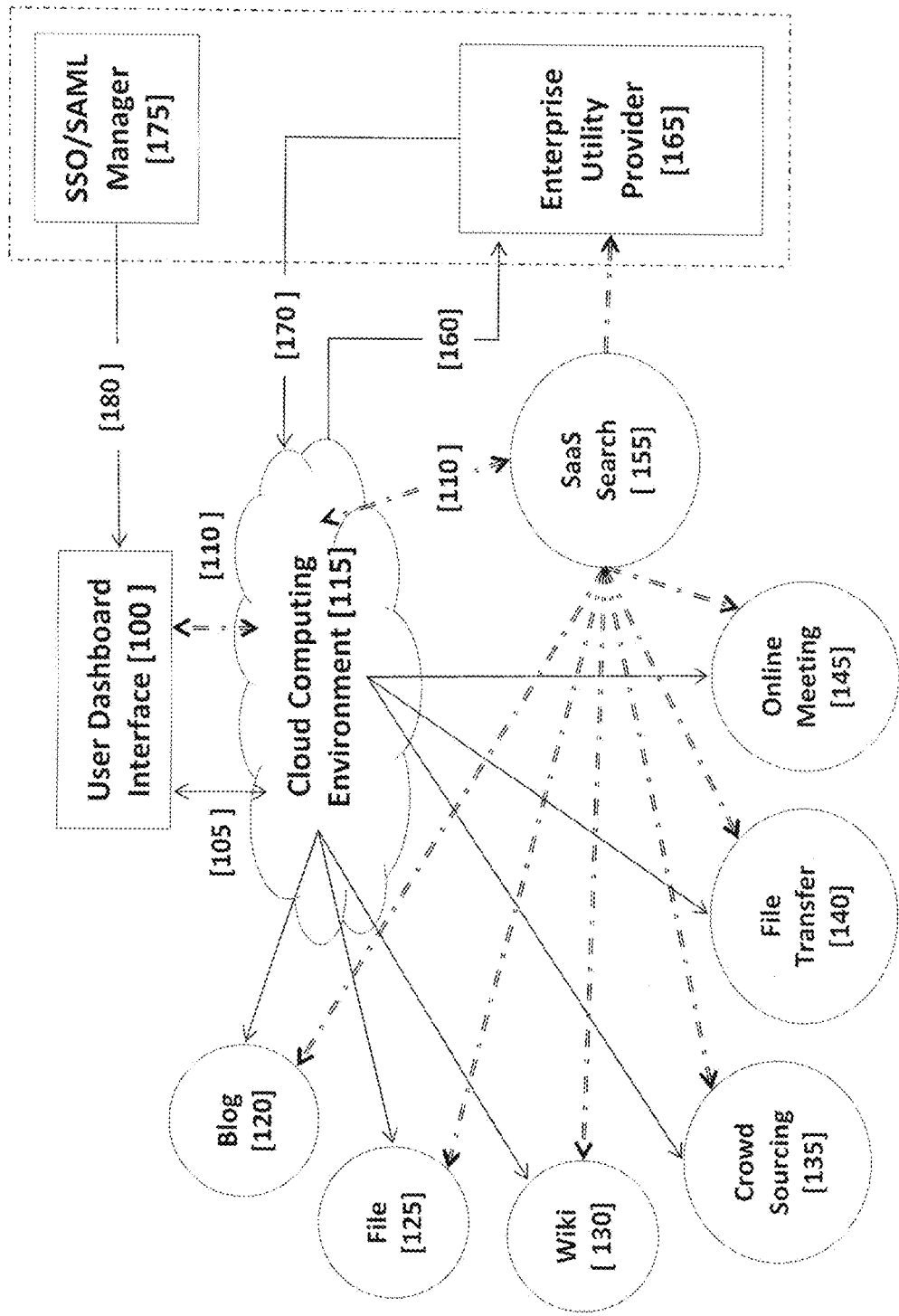
Figure 1. Invention Overview Illustrating SSO/SAML Features with Unified Search Utility

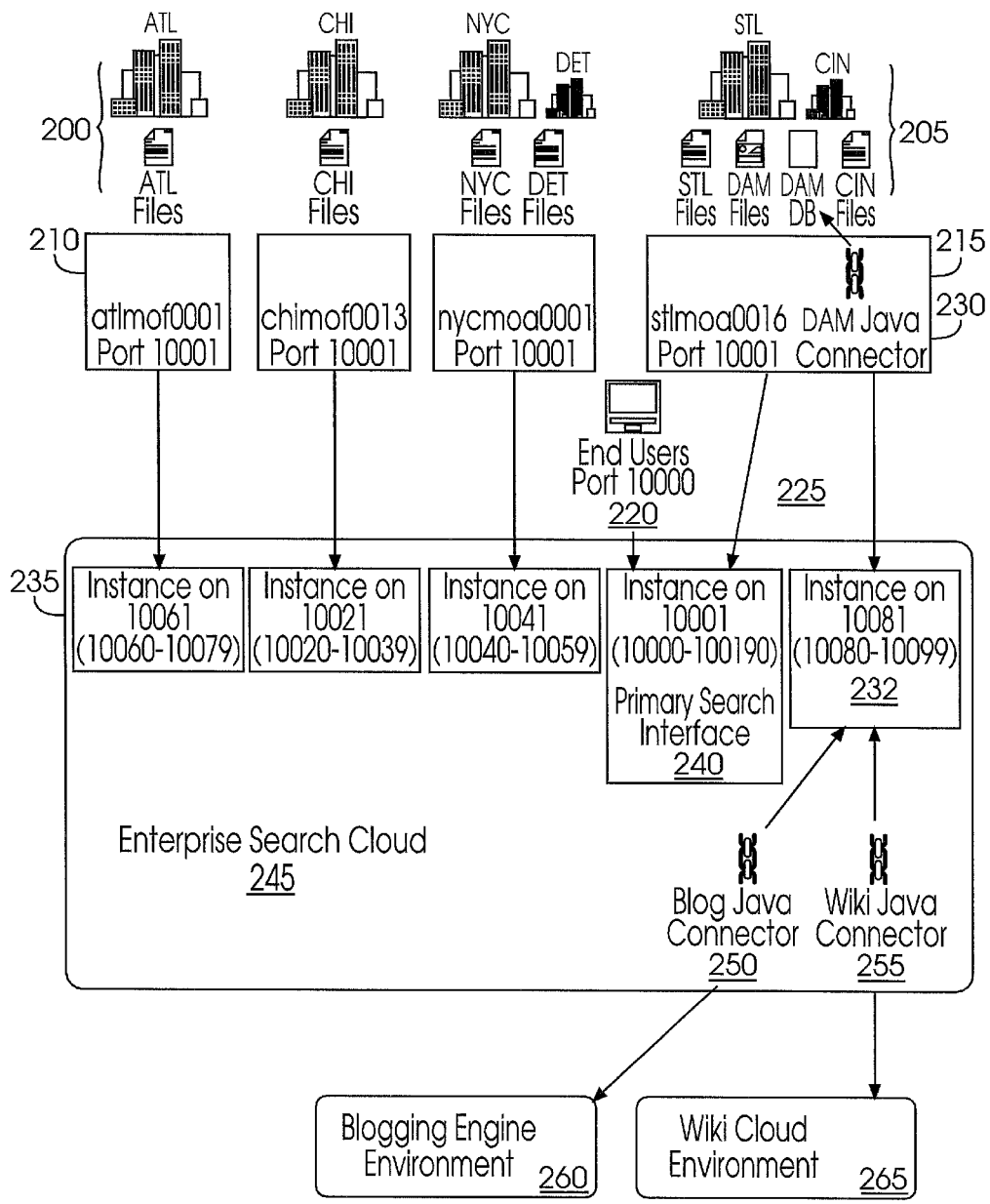
Figure 2 Exemplary Diagram of Cloud Computing Search Engine Hardware Elements

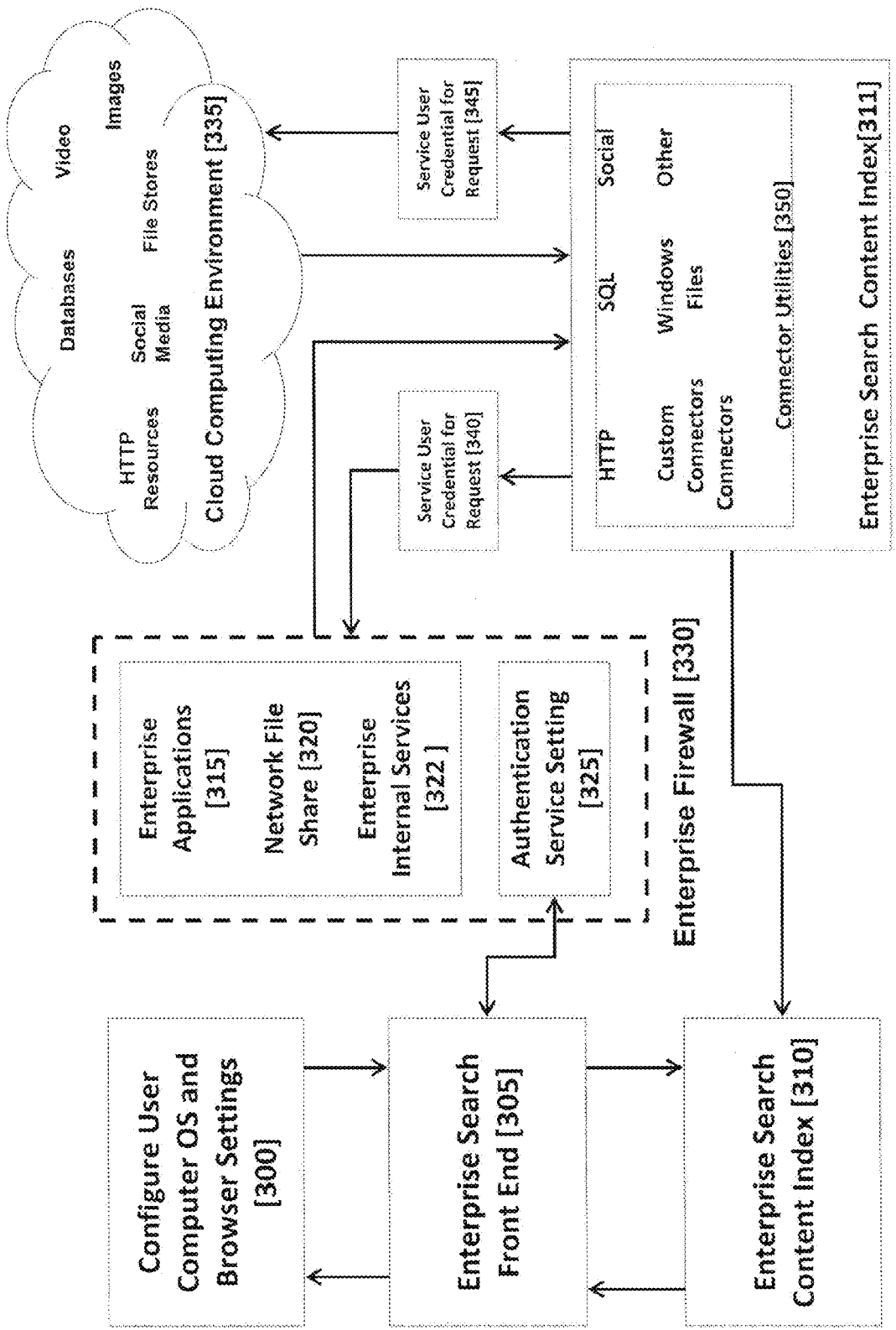
Figure 3. Invention Search Enterprise Process Elements

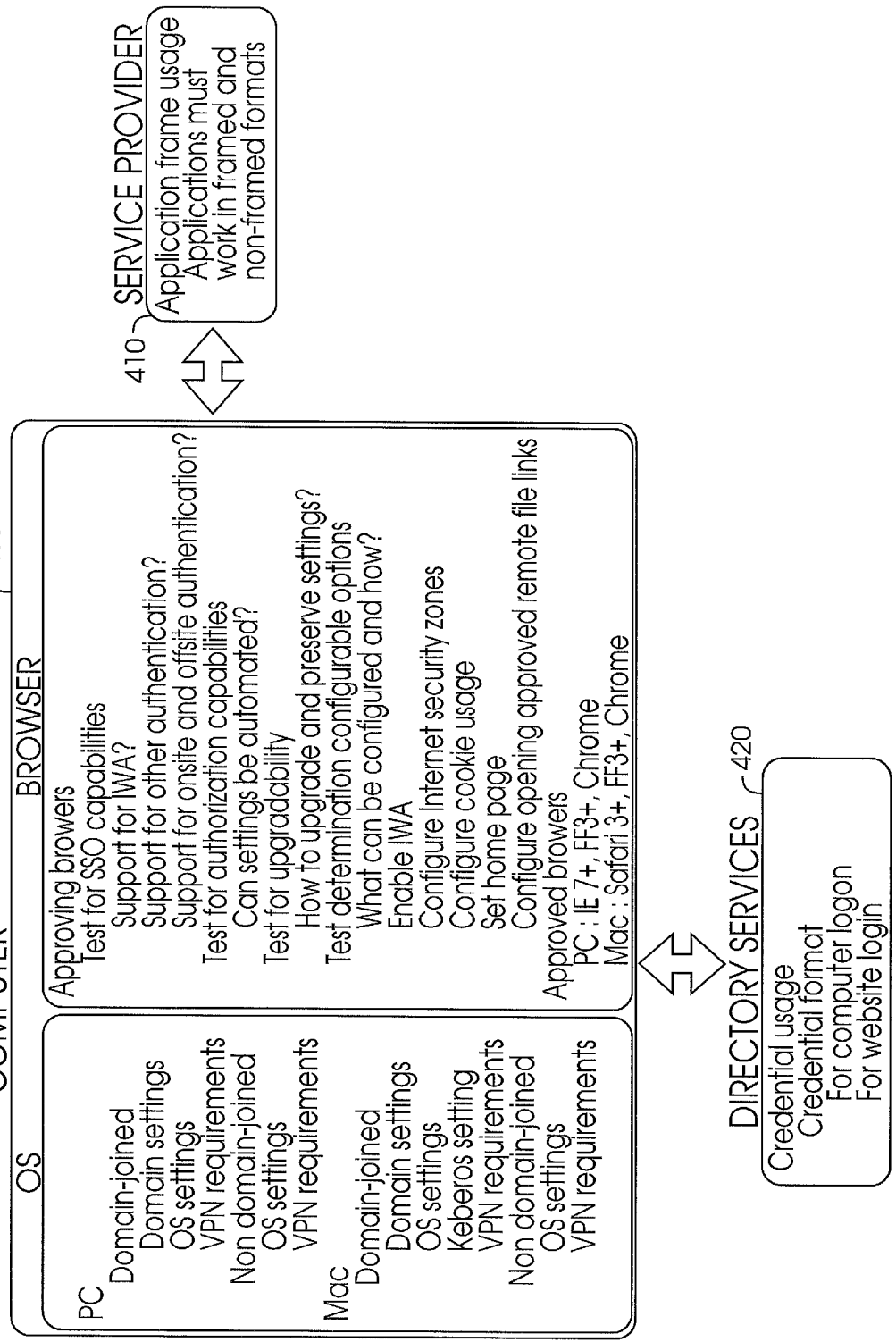
Figure 4 Exemplary Configuration Menu for Invention Process Elements

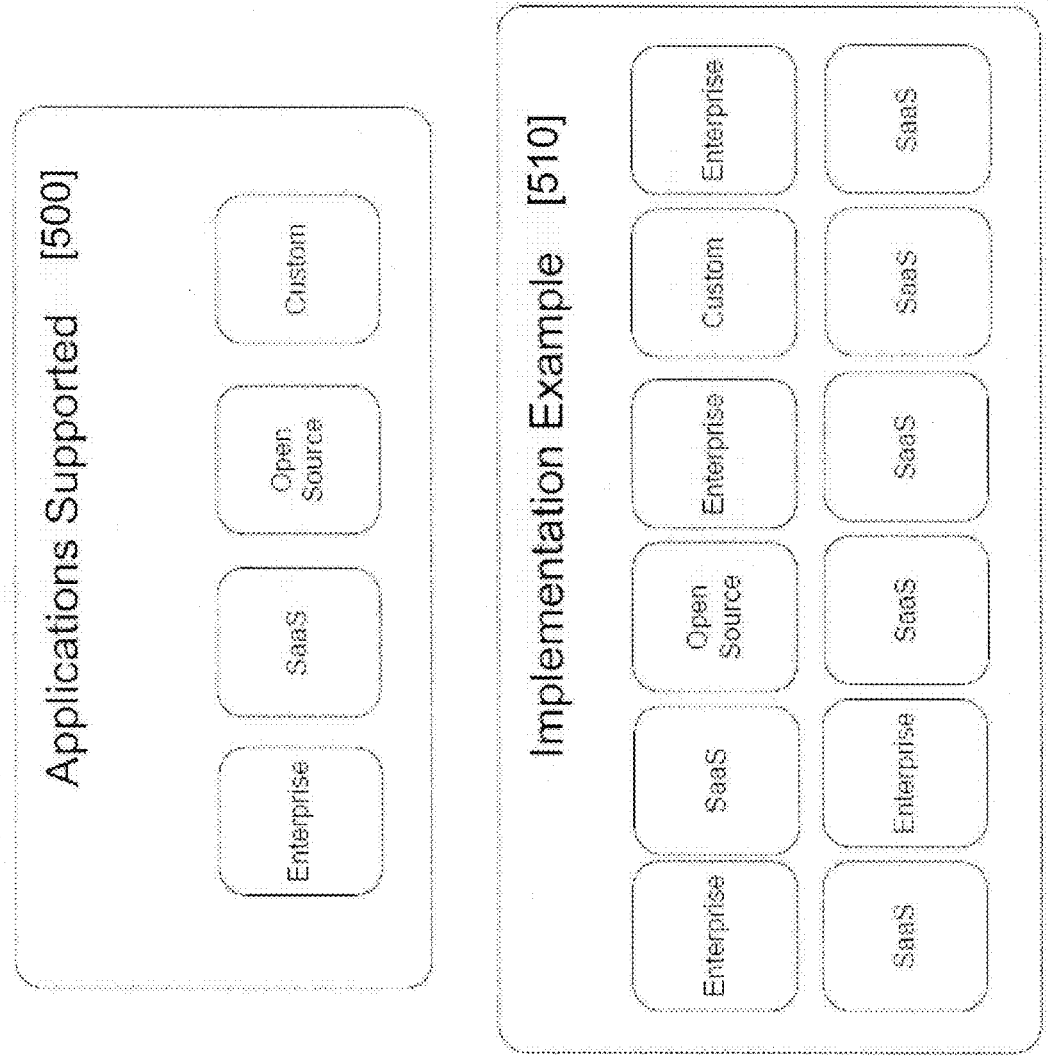
Figure 5. Exemplary Applications Implemented into Invention Process

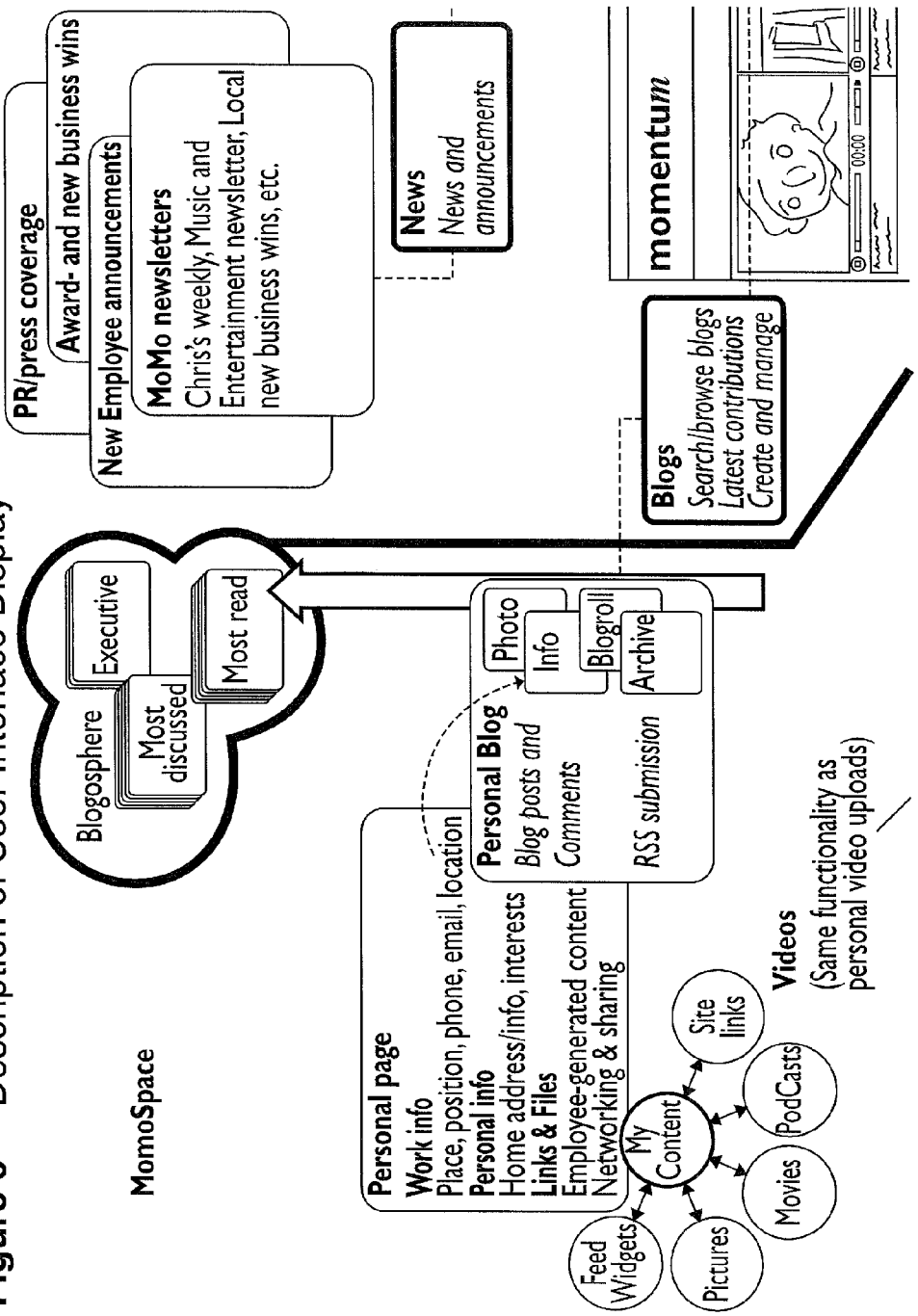
Figure 6   Description of User Interface Display

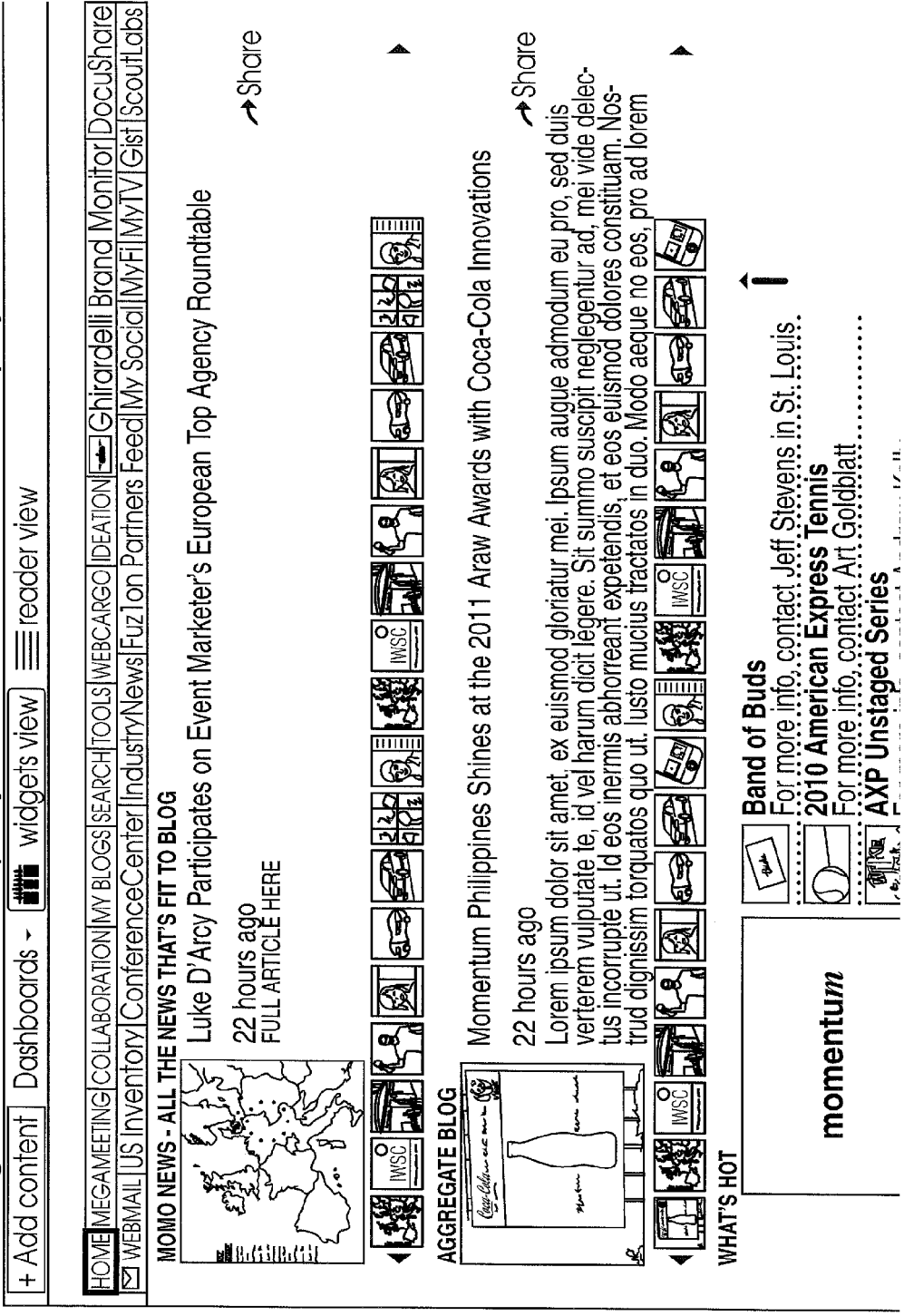
Figure 7  Exemplary Screen Shot of user Display Interface

Figure 7A

SharePoint "theneuralinework" | OneSource | WilliamGrant | WheatThins | H STS 2010 | SEA | Airline Industry | mShare
WG:NEWS | MOMO OFFICE ADMIN LINKS | IT Tools | New Tab 33 | Fuzemeeting.com | WEB CONFERENCING | New Tab 👤 Doug Pierce ▼ | Settings | ⏻ Sign Out
mySite                                                                    ⓜ

SIGNALS

MOMO.EDU

Learn more at
(momo.edu)  my.momentumww.com

AD WIDGET
AdAge  NY Times  Mashable  Brandweek

▫ Conde Nast Finds a spot for Wagenheim as New Teen Vogue Publisher
10 hours ago
Lorem ipsum dolor sit amet, ex euismod gloriatur mei. Ipsum augue
admodum eu ...

▫ RadioShack Launches a Creative Review 15 hours ago
Lorem ipsum dolor sit amet, ex euismod gloriatur mei. Ipsum augue
admodum eu ...

▫ ABC Says 'Pam Am' Not Canceled, 'In Contention' for Second Season
3 hours ago
Lorem ipsum dolor sit amet, ex euismod gloriatur mei. Ipsum augue
admodum eu ...

older ▲

Figure 8 Exemplary Screen Shot of Collaboration Tab Accessed Through User Display Interface

| + Add content | Dashboards ▾ | 🏠 widgets view | ≡ reader view |

HOME | MEGA MEETING | COLLABORATION | MY BLOGS | SEARCH TOOLS | WEBCARGO | IDEATION | ➡ Ghirardelli Brand Monitor | DocuShare
☑ WEBMAIL | US Inventory | ConferenceCenter | IndustryNews | Fuz1on Partners Feed | My Social | MyFi | MyTV | Gist | ScoutLabs

COLLABORATION

| Dashboard | People ▾ | Groups ▾ | Signals | Workspaces ▾ |

Welcome
Doug Pierce

Global Workspaces
- Global Communications   ● MOMO.EDU
- Wiki Workspace Index View or Edit this page from Momentum Workspaces Index

Active Content       🗆 🗗 ☒
 Watched  Edited  Emailed  Viewed

Most viewed pages in the last 1 week from account
wiki.momentumww.com *(Rotate is on)*

- WW Global Growth                    19 ▢
  from WW Global Growth
- momo.edu                            15 ▢
  from momo.edu
- Global Communications               14 ▢
  from Global Communications
- Digital Asset Management server (DAM)

Activities
Post to Fuz1on (13 users)*
What are you working on?
Private to: ✉ Insert: 🖼 📎 📷 🎬 📊 📋
Showing all events ▾ from everyone ▾ within

- Tom Mcneil 14 hours ago
  edited Ex euismod gloriatur mei in gnnjsi Bnmm
- Hilary Vigor 16 hours ago
  edited Mex euismod gloriatur mei
- Hilary Vigor 16 hours ago
  edited Tloriatur mei vd jjk
- Hilary Vigor 16 hours ago
  edited Gexgloriatur meeuismodi
- Hilary Vigor 16 hours ago
  edited GNNuismod gloriatur mei

Figure 9 Exemplary Screen Shot of Blog Utility Accessed Through User Display Interface

| + Add content | Dashboards ▸ | ▦ widgets view | ≡ reader view |

| HOME | MEGAMEETING | COLLABORATION | MY BLOGS | SEARCH | TOOLS | WEBCARGO | IDEATION | ⇥ Ghirardelli Brand Monitor | DocuShare |
| ☑ WEBMAIL | US Inventory | ConferenceCenter | IndustryNews | Fuz1 on Partners Feed | My Social | MyFi | MyTV | Gist | ScoutLabs |

MY BLOG

| Doug Pierce ▾ | Write Entry |

⌂ Create ▸   Manage ▸   Design ▸   Preferences ▸   Tools ▸   ⟳   📖 Help                                       Search Entries ⌕

Doug Pierce

| BLOG STATS | Entries | Comments | Tags | Registrations ⊗ |

Ipsum augue admodum eu pro, sed duis verterem vulputate te, id vel harum dicit legere. Sit summo suscipit neglegentur ad, mei vide delectus incorrupte ut. Id eos inermis abhorreant expetendis, et eos euismod dolores constituam. Nostrud dignissim torquatos quo ut. Iusto mucius tractatos in duo. Modo aeque no eos, pro ad lorem moderatius. Nam natum molestie scribentur in, ad qui minim atomorum. Vim at nemore convenire sapientem, vel ne porro accusam sententiae, ei mazim munere cum. Nibh vidit euismod nec at, id tritani noluisse delectus has. Ipsum necessatibus nec id, ut quo dicant corrumpit hendrerit, in has idque viris posnium. Quo ei sint ubique omnesque.

THIS IS YOU

Doug Pierce
Your last entry was Sep 19 in Doug Pierce.
You have 2 drafts.
You've written 166 entries with 22 comments.
                          Edit your profile

HANDY SHORTCUTS

🖳 Plugins              ⌕ Search & Replace
   Trackbacks          🗐 Activity Log
🗎 Import Content         Blog Preferences MT News    Learning MT June 22, 2011
Lorem ipsum dolor sit amet, ex euismod gloriatur mei et Ipsum augue.

| Select a Widget... | ▸ Add |

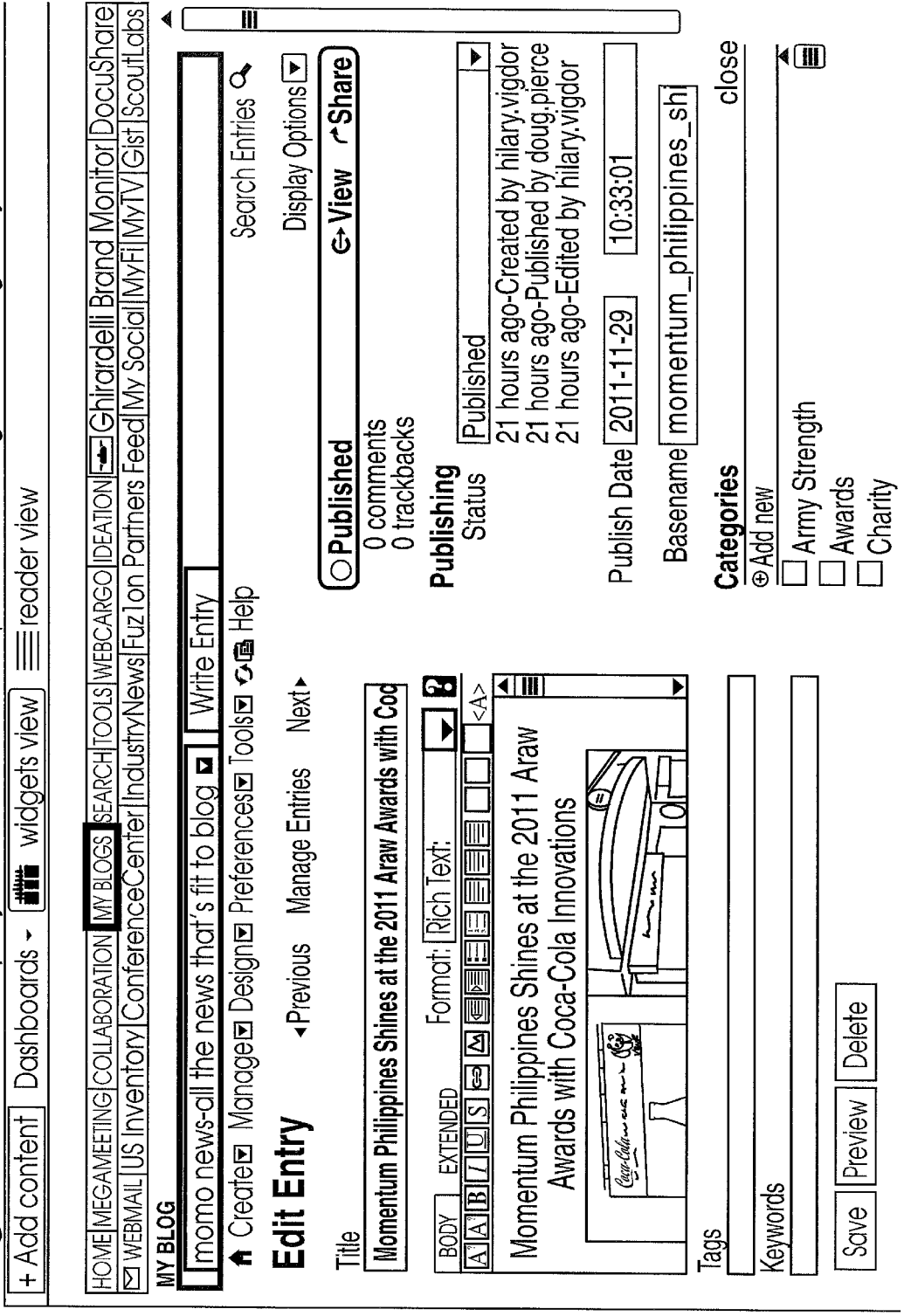
Figure 10  Exemplary Screen Shot of Enterprise News Blog Within Blog Utility Feature

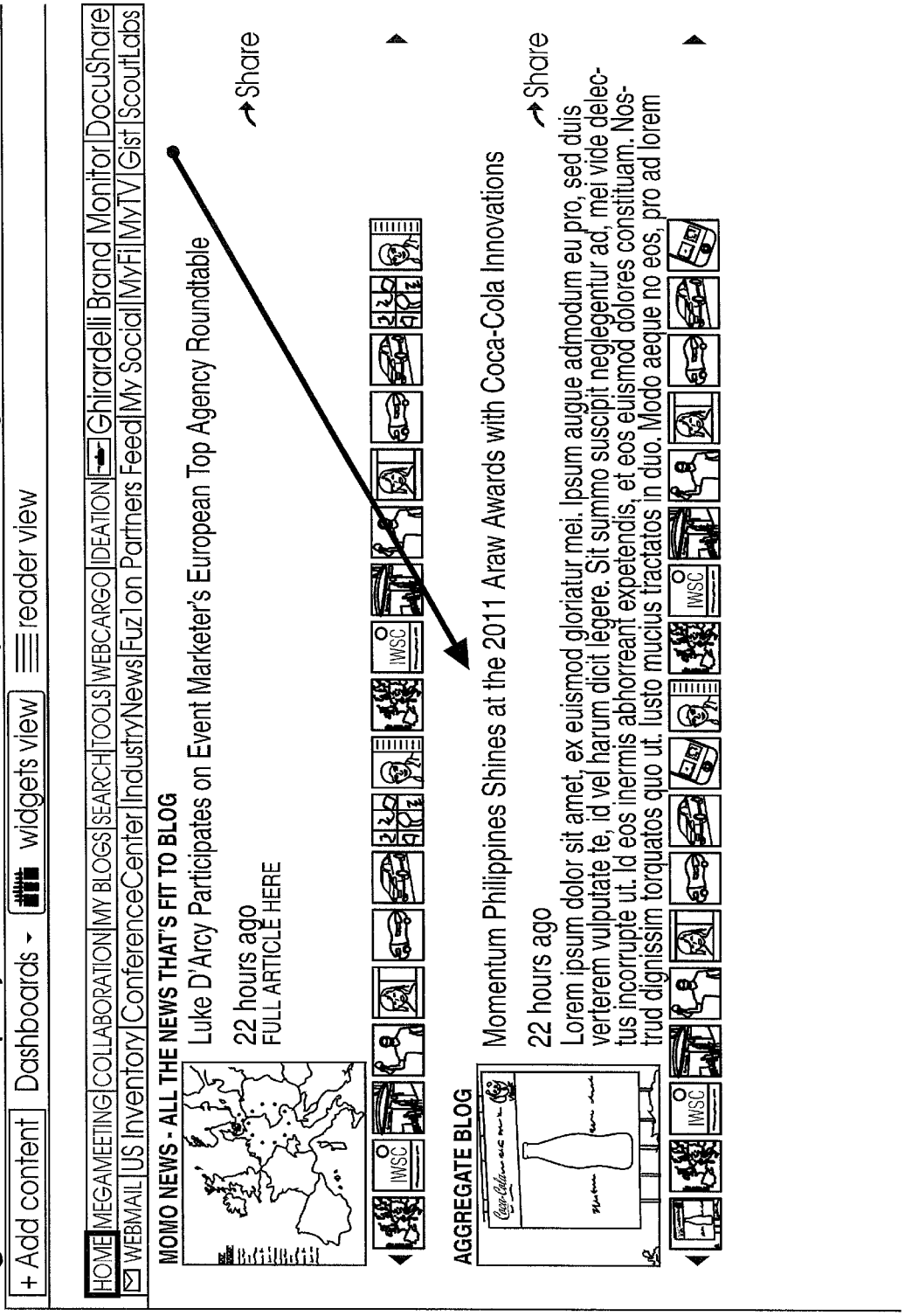
Figure 11 Exemplary Screen Shot of Enterprise News Blog Incorporated on the Home

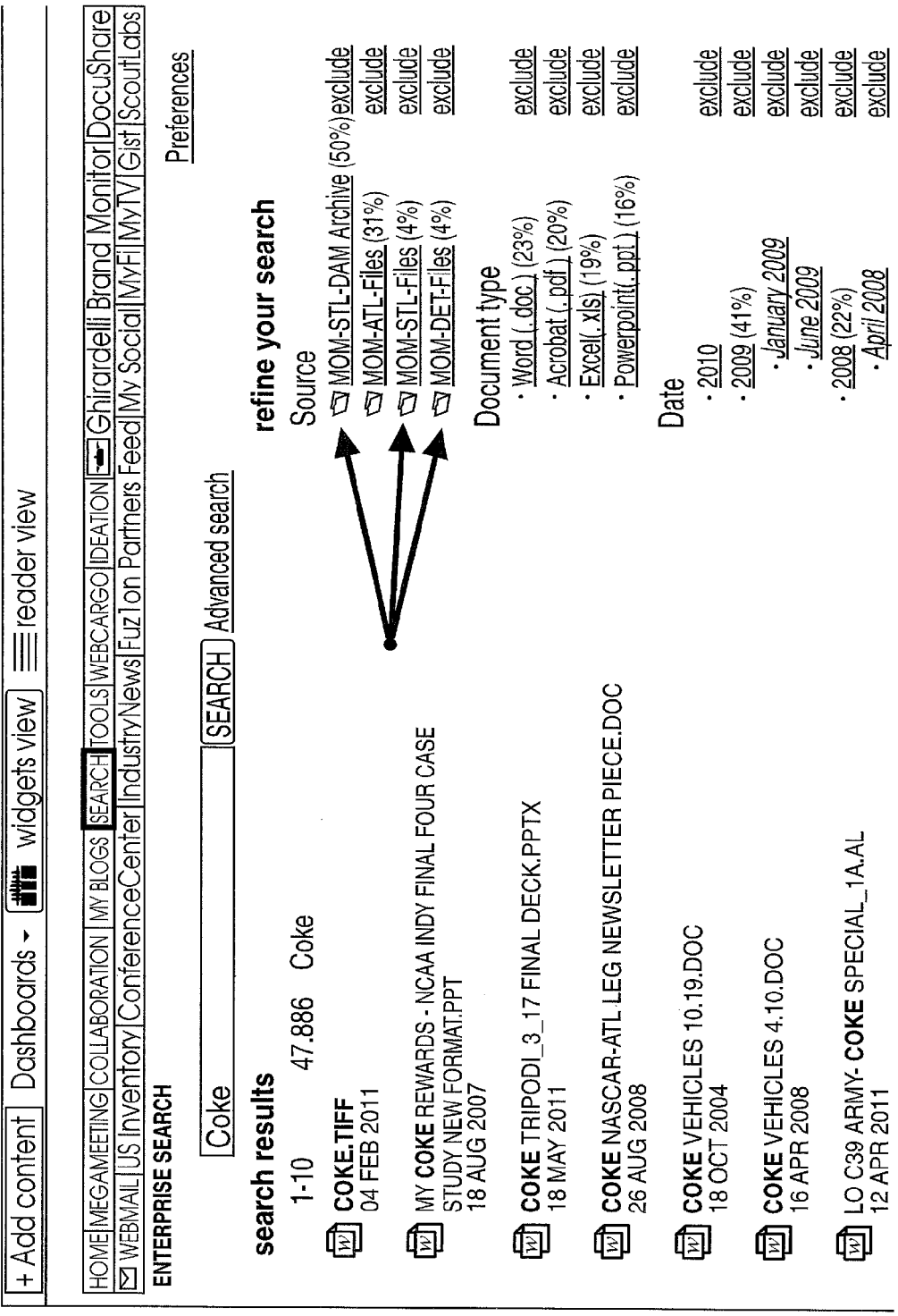
Figure 12 Exemplary Screen Shot of Enterprise Search Product to Provide Search Across The Entire Data Set of an Organization

Figure 13 Exemplary Screen Shot of Enterprise SaaS Product Providing Large File Transfer
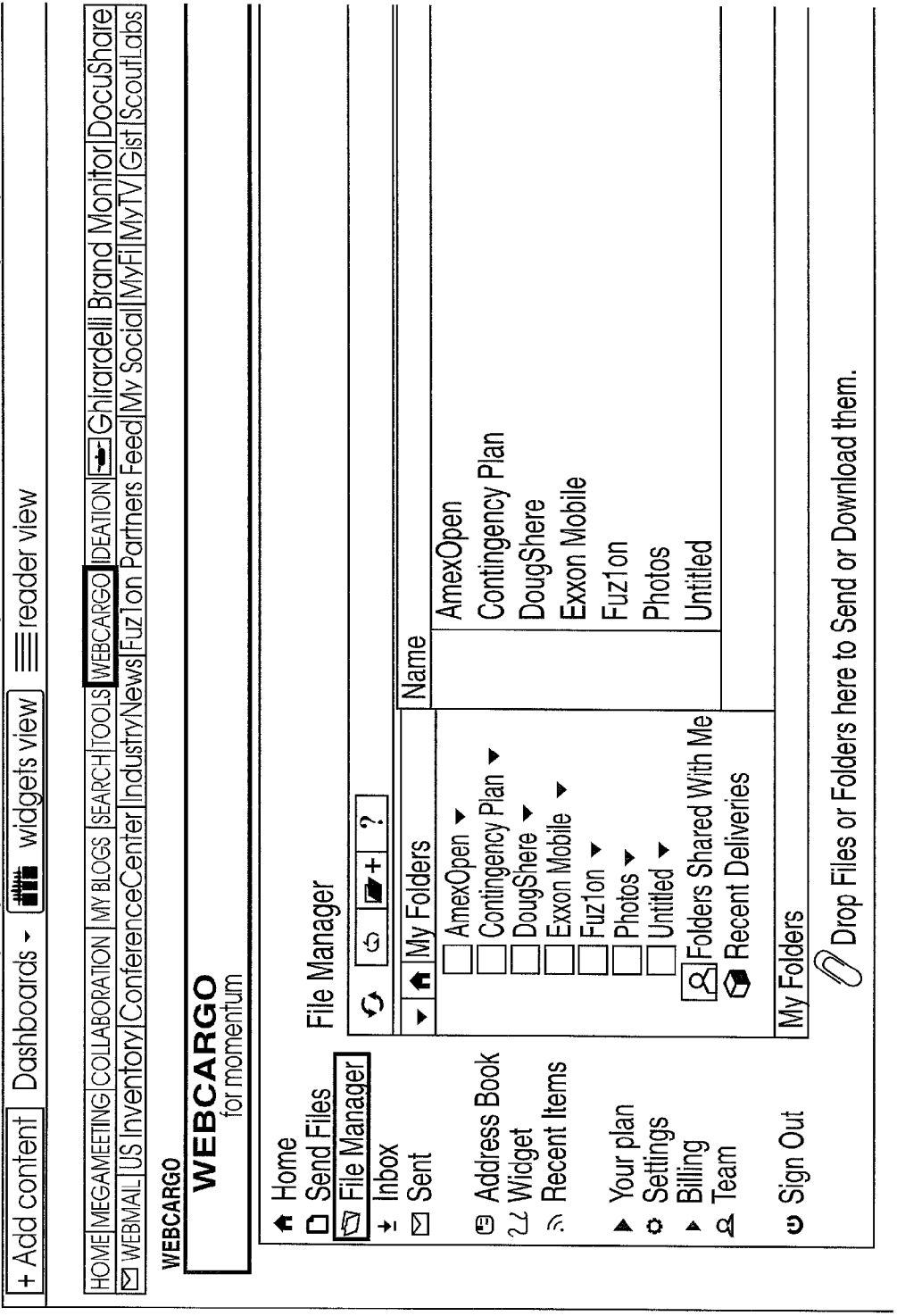

Figure 13A and Cloud Files

SharePoint|"theneuralinework"|OneSource|William|Grant|WheatThins|H STS 2010|SEA|Airline Industry|mShare
WG:NEWS|MOMO OFFICE ADMIN LINKS|IT Tools|New Tab 33|Fuzemeeting.com|WEB CONFERENCING|New Tab Doug Pierce ▼ | Settings | ⏻ Sign Out mySite 2.121 GB available Search:

| | Created | Size | Actions |
|---|---|---|---|
| ◀ | 10 May 2011 11:43 | 1013.386 Mb | actions ▶ |
| ◁ | 25 Aug 2011 05:15 | 72.264 Mb | actions ▶ |
| ◁ | 9 Aug 2010 2010 07:54 | 64.027 Mb | actions ▶ |
| ◁ | 22 Feb 2011 10:30 | 103.382 Mb | actions ▶ |
| ◁ | 8 Oct 2010 10:31 | 317.760 Mb | actions ▶ |
| | 19 may 2011 11:23 | 5.455 Mb | actions ▶ |
| | 26 Jul 2011 12:54 | 0.000 G | |

Items: 7, 388, 403 Mb

Figure 14 Exemplary Screen Shot of Enterprise Saas Product Providing "Partner Videos" Inside

| + Add content | Dashboards ▼ | widgets view | reader view |

| HOME | MEGAMEETING | COLLABORATION | MY BLOGS | SEARCH | TOOLS | WEBCARGO | IDEATION | ➔ | Ghirardelli Brand Monitor | DocuShare |
| WEBMAIL | US Inventory | ConferenceCenter | IndustryNews | Fuz1on Partners Feed | My Social | MyFi | MyTV | Gist | ScoutLabs |

COLLABORATION

| Dashboard | People ▼ | Groups ▼ | Signals | Workspaces ▼ |

Private Workspaces  IT Test WIKI  What's new  My Watchlist  Blogs  Add Members  Likes 🔒 📓 Edit  💬 Comment

IT Test WIKI

⊙ Partner Video's  Public folder shared by Doug Pierce

| Name | ▲ | Modified | Size | Actions |
|---|---|---|---|---|
| MegaMeeting Sizzle.mov | | 18 Jan 2011 07:01 | 18.551 mb | actions ▶ |
| NetVibes Sizzle.mov | | 18 Jan 2011 07:06 | 17.619 Mb | actions ▶ |
| Social Text Sizzle.mov | | 18 Jan 2011 06:56 | 31.903 Mb | actions ▶ | items: 3,068.073 Mb

| Clear List | Send Files | Download Files |

/Fuz1on/Partner Video's

📎 Drop Files or Folders here to Send or Download them.

Figure 15     Exemplary Screen Shot of New Tab in Dash Board Containing Work From a
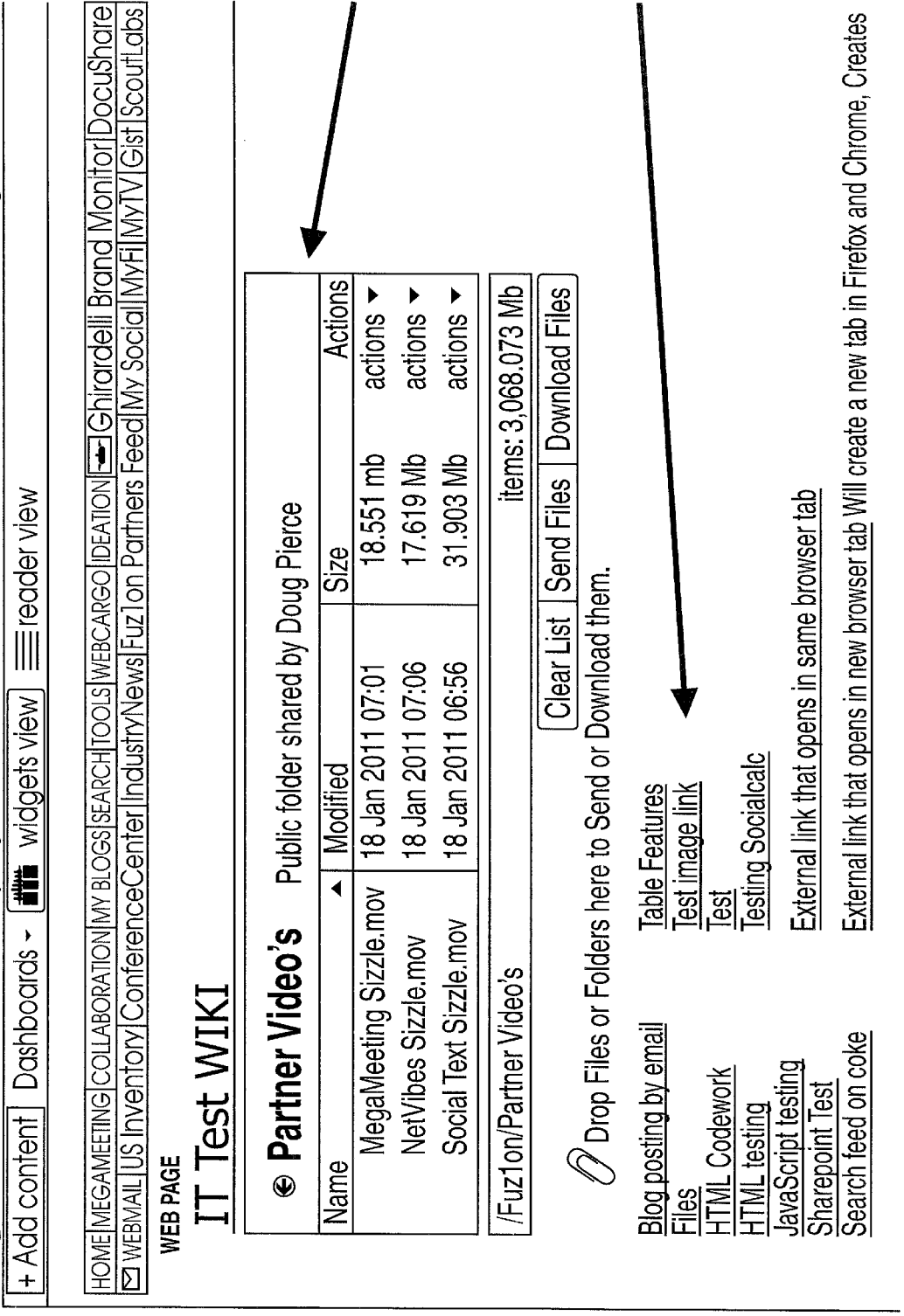

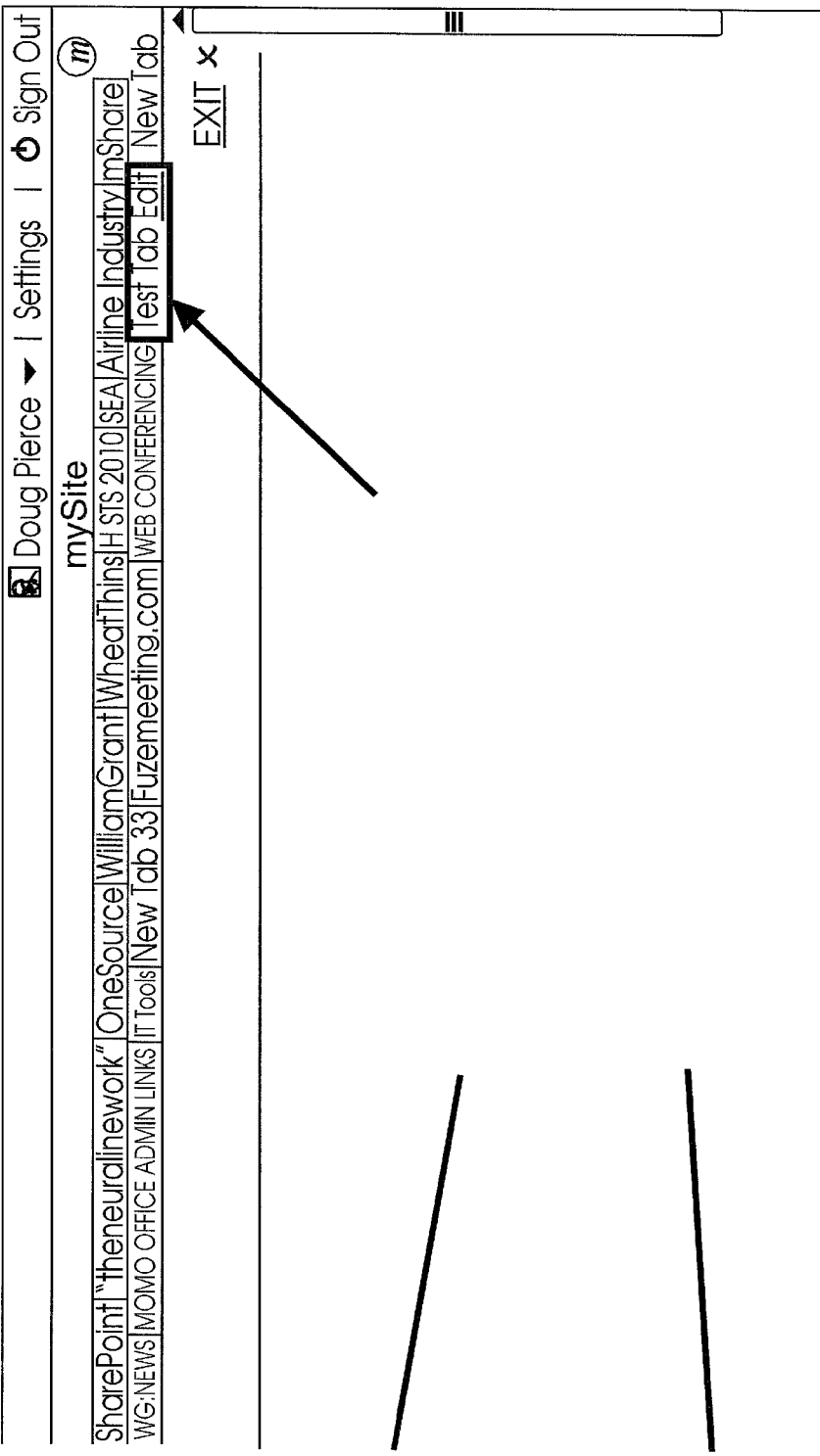

INTEGRATED ENTERPRISE SOFTWARE AND SOCIAL NETWORK SYSTEM USER INTERFACES UTILIZING CLOUD COMPUTING INFRASTRUCTURES AND SINGLE SECURE PORTAL ACCESS

CROSS REFERENCE TO RELATED APPLICATION(S)

This application claims priority to U.S. Provisional Patent Application Ser. No. 61/444,020, filed Feb. 17, 2011, the entire disclosure of which is incorporated herein by reference.

BACKGROUND

1. Field of the Invention

This disclosure relates to the field of software-based methods and systems to provide a secure user interface on multiple and diverse electronic computing devices with a customized and secure dashboard feature 2. Description of the Related Art Advancements in computing and telecommunications rapidly develop new and improved configurations, products and services that businesses struggle to integrate into their operations. In the case of software products and systems, accounting software, customer relationship, supply chain management, and records management are examples of such products that undergo frequent and rapid change. Often businesses and other enterprises must rewrite software and periodically change device user interfaces to integrate such advancements and improvements. Typically IT (Information Technology) departments are responsible to accommodate such enterprise demands. The limited resources of IT departments are frequently overwhelmed by such demands which results in inefficiency and delays in utilizing such improvements. Further, the development of new communication protocols and systems, known as social networks have significant impact on the contemporary culture of telecommunication which enterprises are seeking to integrate into their particular business practices. Examples of such social networks include the services provided by Twitter and Facebook. Blogs and computer based 'chat rooms' are further examples of social network communications.

The difficulties in enterprises' abilities to seamlessly integrate separate software systems from multiple developers and their vendor partners onto single user interfaces is a function in part of the culture of software system development. Vendors compete with one another to provide sole sourcing of integrated software platforms to enterprise customers. It is counterintuitive for such vendors to permit competitors to integrate or interchange portions of their software products with other vendor products because it decreases revenue opportunities for particular vendors if they introduce such competing products to their enterprise customers and prospects. The difficulty for enterprises is that they often choose software products from a single vendor that collectivity may not be 'best in class' for all of an enterprise's software and information management needs. Further, data management among diversely originated software may be incompatible for an enterprise that must share data among diverse software products. Again, an enterprise may have to undertake additional and substantial software code development to reconcile such diverse software operating systems.

Therefore, a first object of the present invention is to provide a uniform user interface system capable of accessing current and future 'best in class' software solutions that are operationally optimal to an enterprise.

Social networks involve open, spontaneous, multiparty communications that sometimes conflict with enterprises' needs for secure and confidential communications. Enterprise users of such social networks are better enabled if the social networks can be conveniently accessed within a common user interface. Likewise access to multiple enterprise software services within a common user interface enhances productivity because users do not have to enter and exit software silos each with different sign-on protocols.

Therefore, a second object of the invention is provide a security system and method that both simplifies user interface access to secure software systems while permitting social network systems access that do not compromise secure and proprietary computer and communication activities of the enterprise.

The user interface of the current invention provides for novel development of creative processes both within an enterprise and between the enterprise and external communities via telecommunications and computer mediated developments. This process is sometimes referred to as 'ideation'. These interactions are likely to identify creative opportunities, stimulate and implement development and result in novel and useful inventions or similarly proprietary assets.

Therefore, an additional object of the present invention is to provide computer mediated means to undertake such creative opportunities through secure disclosure and computer mediated development where property rights are secured to the collaborators prior to implementation of the creative opportunity.

In the prior art, the difficulties of enterprises to integrate separate software systems from multiple developers and their vendor partners onto single user interfaces is a function was well known. Due to the prevailing culture of software system development, prior art solutions relied on vertical, horizontal of layered integrations of single vendor source software. Single vendor software refers to source code and other software developed under a common proprietary scheme wherein individual software professionals combine and create software utilities that is written and licensed exclusively through the control and direction of owner of a specific vendor enterprise. Further, such prior art solutions have often relied in part on operations limited to particular hardware and data communications equipment which has limited the utility of the prior art to enterprises seeking such utilities.

In the prior art, multiple vendors of single vendor software have existed and provided separate software solutions. It is well known that vendors compete with one another to provide sole sourcing of integrated software platforms to enterprise customers. It is counterintuitive for such vendors to permit competing vendors to integrate portions of their respective software products with the specific vendor's products because it decreases revenue opportunities for each separate vendors if they introduce such competing products to their enterprise customers and prospects. The difficulty for enterprises is that they often choose software products from a single vendor that collectively may not be 'best in class' for all of an enterprise's software and information management needs. Alternatively, while such prior art solutions may be satisfactory to an enterprise's requirements at the time of installation, such solutions tend to become obsolete due to evolution of the enterprise's business activities or the development of new software based utilities that are incompatible with the previously installed software utilities. Further, data management among diversely originated software may be incompatible for an enterprise that must share data among diverse software products. Again, an enterprise may have to undertake additional and substantial software code development to reconcile such diverse software operating systems and applications. The present invention overcomes these problems recognized in the prior art through novel use of software platforms that are sourced to and operate through a cloud computing environment. Further, the present invention provides a novel method to operate concurrently with existing installed software utilities of an enterprise while extending the enterprise's software capabilities through cloud computing based software utilities. Since certain cloud based utilities provide for shared software applications and social media utilities, the present invention provides a novel and broadly based utility to maintain and secure proprietary enterprise data and systems through a secure system of operation and data management without loss of utility of such previously mentioned utilities.

SUMMARY

Because of these and other problems in the art, discussed herein, among other things, is an enterprise user interface system comprising; a digital electronic device in communication with screen device for displaying a user interface; a user interface configured as a dashboard digital display; at least one functionally interchangeable third party Software component accessed through cloud computing using the user interface; a functionally interchangeable software based security component to communicate securely with all software components displayed through the user interface; a functionally interchangeable software based search engine for universal search functions processed through the dashboard; at least one functionally interchangeable third party software that enables social networking communication; and at least one functionally interchangeable enterprise software system that is accessed by the user interface.

In an embodiment, the system utilizes a functionally interchangeable software system for uniform file configuration and management with respects to all software systems accessed by the user interface.

In an embodiment, said functionally interchangeable software is remotely accessed and enabled through cloud computing.

In an embodiment, said uniform files are stored and accessed using cloud computing.

In an embodiment, assembly of the user interface utilizes a computer code to assemble the user interface to allow functionally interchangeable software to be accessed through the user interface.

In an embodiment, the computer code is remotely accessed from an information technology administrator entity.

In an embodiment, a particular user interface is designed by a computer code using user interface specifications furnished by an enterprise for use by its permitted members.

In an embodiment, the computer code is remotely accessed from an information technology administrator entity.

In an embodiment, said specifications include at least one specification furnished by a permitted member to design a compatible enterprise user interface that is specific to said permitted member.

In an embodiment, a particular user interface is installed on a user interface device by a computer code.

In an embodiment, the computer code is remotely accessed from an information technology administrator entity.

In an embodiment, an access to the invention is enabled through a particular enterprise's web site.

There is also described herein a method of using computerized data and data processing for an enterprise through a user interface comprising; providing a digital electronic device in communication with screen device for displaying a user interface; providing a user interface configured as a dashboard digital display; providing at least one functionally interchangeable third party Software component accessed through cloud computing using the user interface; providing a functionally interchangeable software based security component to communicate securely with all software components displayed through the user interface; providing a functionally interchangeable software based search engine for universal search functions processed through the dashboard; providing at least one functionally interchangeable third party software that enables social networking communication; providing at least one functionally interchangeable enterprise software system that is accessed by the user interface; and having a user access said user interface to utilize said security component, said search engine, and said social networking communication.

In an embodiment, at least one computer datum is generated through said user interface.

In an embodiment, at least one computerized processing of at least one computer datum is processed through said user interface.

In an embodiment, at least one computer datum generation uses cloud computing.

In an embodiment, at least one computerized processing of at least one computer datum uses cloud computing.

In an embodiment, a remote entity administers the invention method.

In an embodiment, storage of at least one computer datum uses cloud computing.

In an embodiment the security component permits or denies access to said data and data processing using algorithms to determine the standing of a particular user within or without said enterprise.

In an embodiment, electronic and digital communications between and among internal members of an enterprise and an external community and various permutations thereof is an intended use.

In an embodiment, at least one communication uses a computerized algorithm to ideate and develop proprietary knowledge.

In an embodiment, the method provides at least one computerized algorithm to electronically document and register such proprietary knowledge rights.

In an embodiment, the method provides at least one computerized algorithm to allocate, account and distribute benefits amongst an enterprise, members of the enterprise, external community members that contributed to such rights.

BRIEF DESCRIPTION OF THE FIGURES

FIG. 1 provides an overview illustrating SSO/SAML features with unified search utility and, without limitation, is an exemplary illustration of an embodiment of system architecture and relationships of it to diverse software packages of various exemplary vendors.

FIG. 2 provides an exemplary diagram of cloud computing search engine hardware elements and, without limitation, illustrates an exemplary adaptation of the search engine features that are used to direct the invention index through remote and local hardware systems in multiple geographic locations using cloud computing.

FIG. 3 provides an exemplary diagram of search enterprise process elements", and, without limitation, is an exemplary illustration of processes used to engage diverse software packages of various exemplary vendors.

FIG. 4 provides an exemplary configuration menu for invention process elements, and, without limitation, describes the user interface elements to customize a specific user's access to and use of the invention in connection with work such specific user performs for the enterprise.

FIG. 5 provides exemplary applications implemented into invention process and, without limitation, describes a matrix of particular applications that may be installed and implemented for a specific user within the enterprise.

FIG. 7 provides an exemplary screen shot of a user display interface.

FIG. 9 provides an exemplary screen shot of blog utility accessed through a user display interface.

FIG. 10 provides an exemplary screen shot of enterprise news blog within blog utility feature.

FIG. 12 provides an exemplary screen shot of an enterprise search product to provide search across the entire data set of an organization.

FIG. 13 provides an exemplary screen shot of an enterprise SaaS product providing large file transfer and cloud files.

FIG. 15 provides an exemplary screen shot of new tab in dash board containing work from a collaboration solution and cloud files from a cloud file solution.

DESCRIPTION OF PREFERRED EMBODIMENT(S)

Figure 6A:
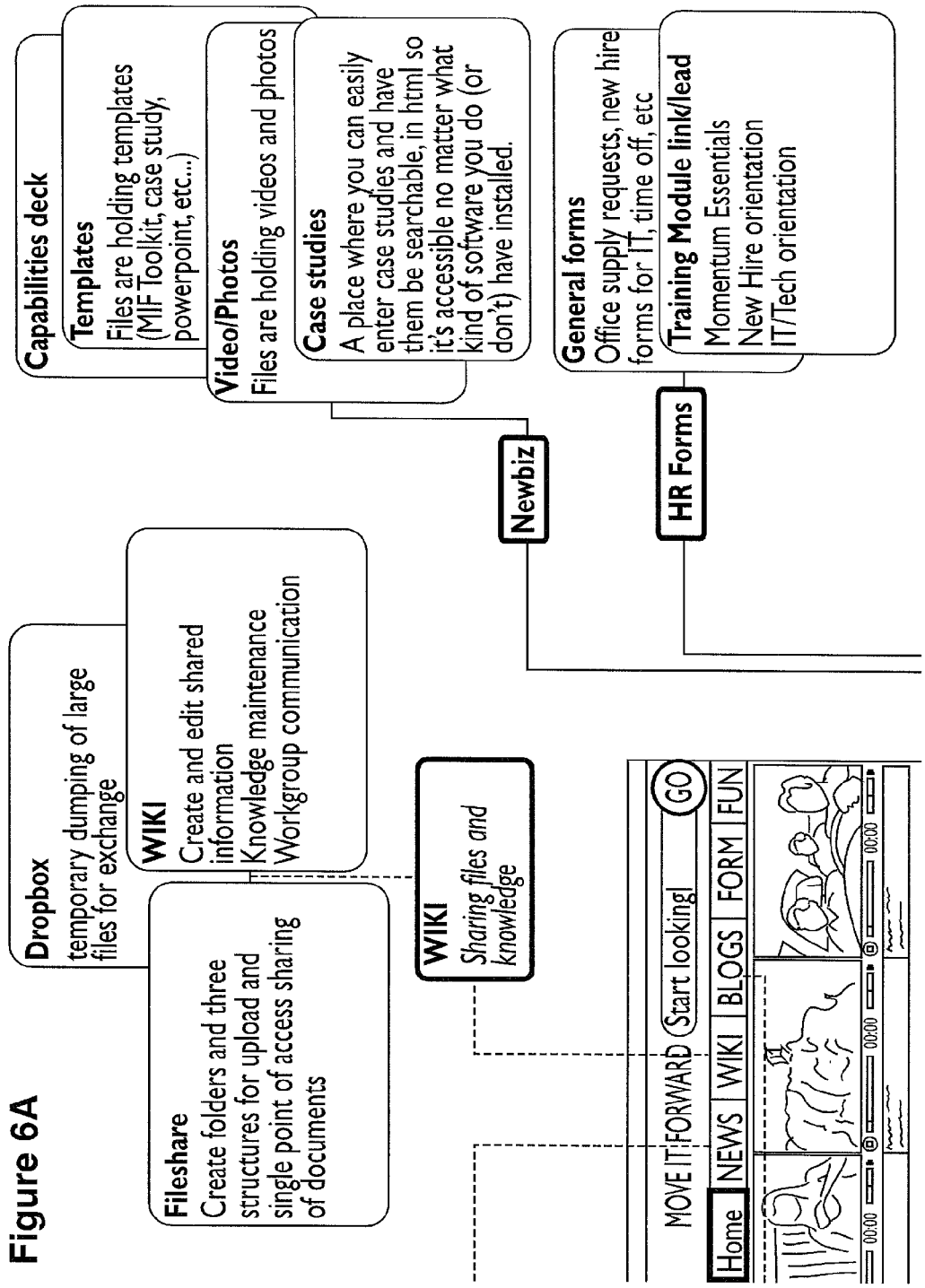
FIG. 6 provides a pictorial description of a user display interface.
Figure 6B:
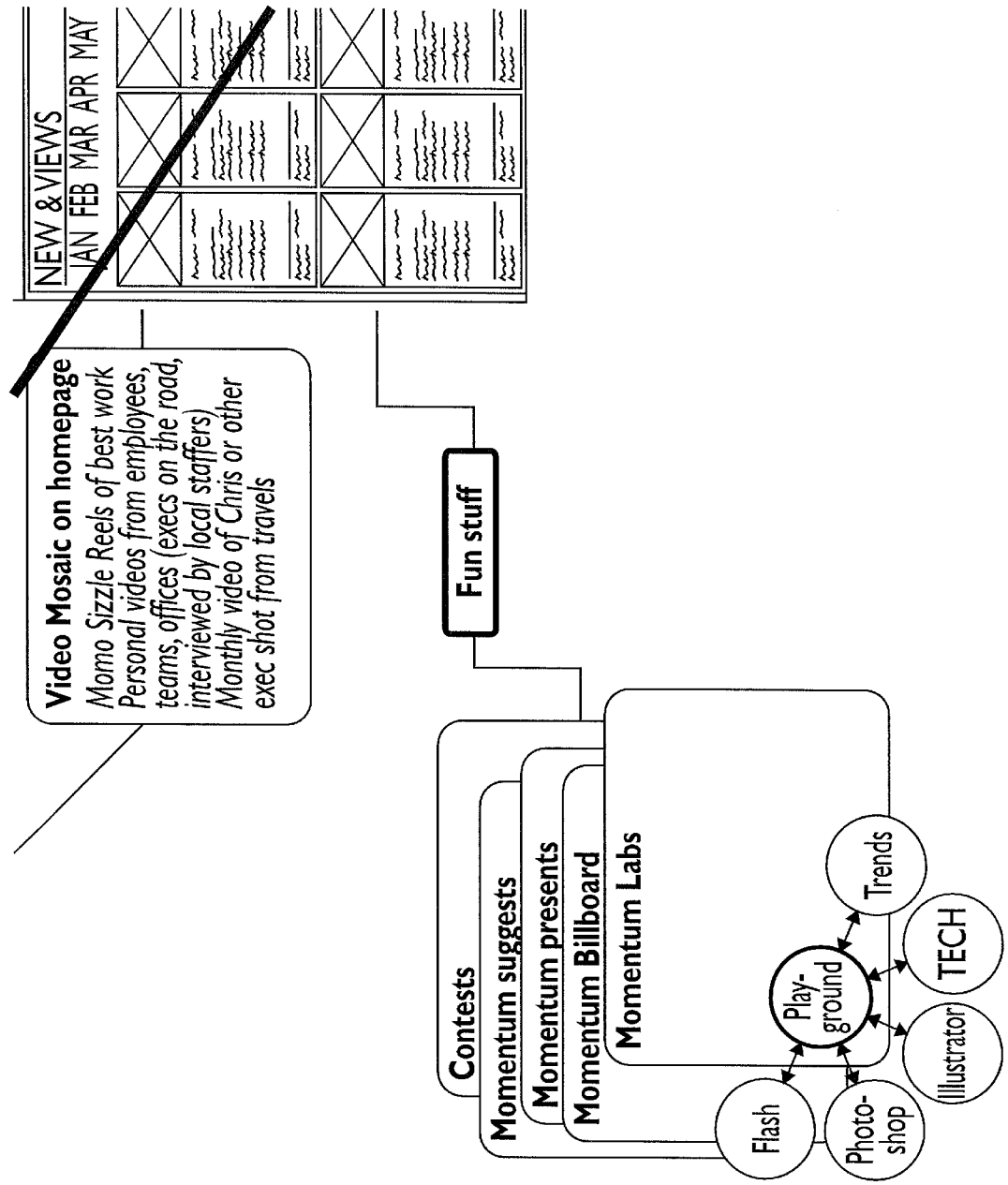
Figure 6C:
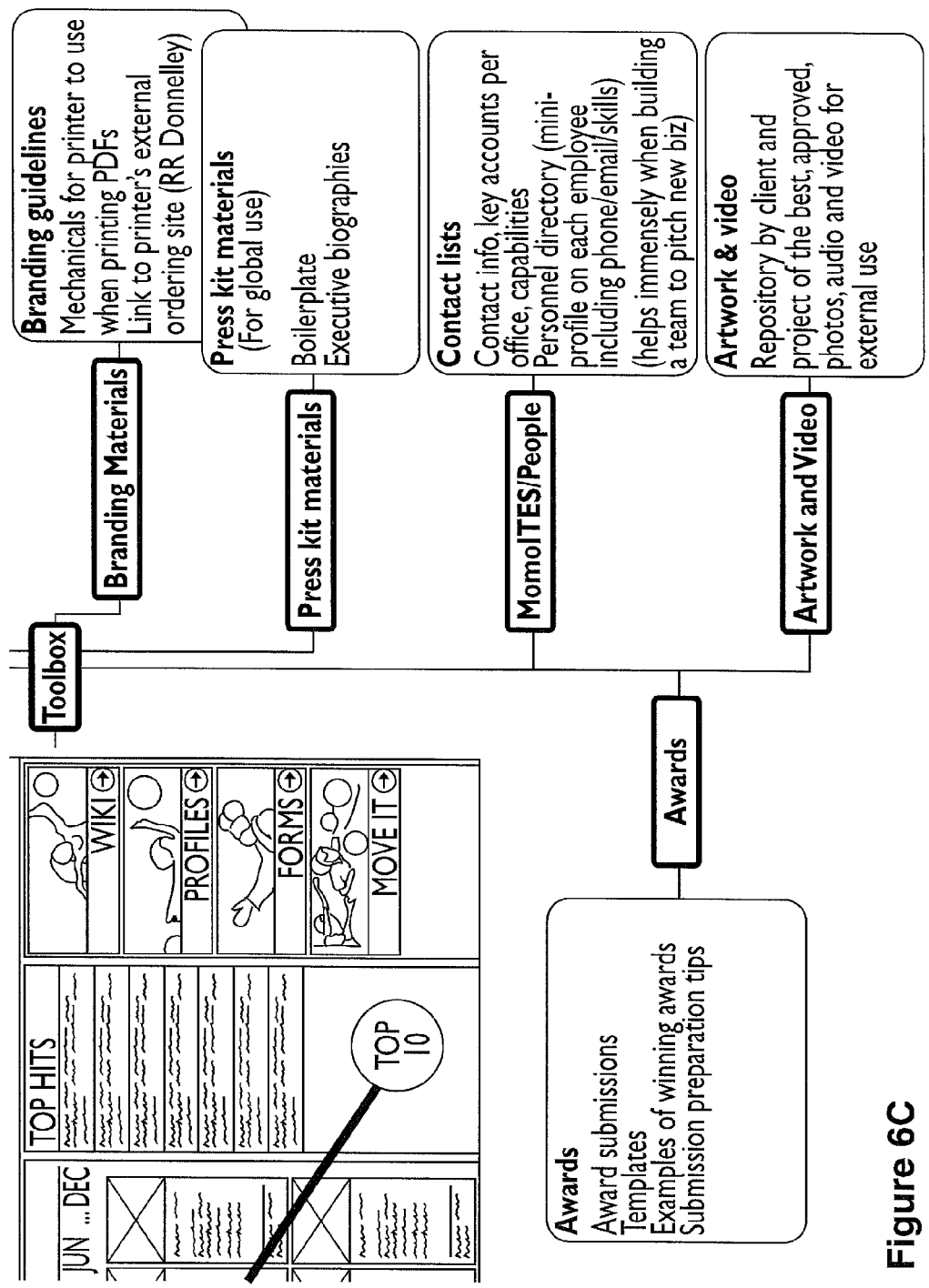

The invention may take numerous forms of device and system configurations that will accommodate a diversity of enterprise utilities. What follows is a preferred embodiment of the useful novelties of the invention. However, for one skilled in the art it will be obvious that the novel features disclosed herein may be employed with equal utility to alternate configurations of the invention elements.

Throughout this disclosure, the term "computer" will be used to describe hardware which implements functionality of various systems. The term "computer" is not intended to be limited to any type of computing device but is intended to be inclusive of all computational devices including, but not limited to, processing devices or processors, personal computers, work stations, servers, clients, portable computers, and hand held computers. Further, each computer discussed herein is necessarily an abstraction of a single machine. It is known to those of ordinary skill in the art that the functionality of any single computer may be spread across a number of individual machines. Therefore, a computer, as used herein, can refer to a single stand-alone machine, or to a number of integrated (e.g. networked) machines which work together to perform the actions. In this way, the functionality of a computer may be at a single computer, or may be a network whereby the computer functions are distributed.

Further, the term "software" refers to code objects, logic, or command structures, written in any language and executable in any environment designed to be executed by or on a computer. It should be recognized that software functionality can be hardwired onto a chip or into other hardware while still considering it software within the meaning of this disclosure.

Further, the term "cloud computing" refers to the delivery of computing as a service rather than a product, whereby shared resources, software, information and data are provided to computers and other devices as a utility similar to the electrical grid and over a network similar to and including the Internet.

Referring now to FIG. 1 is interactive flow chart which summarizes the assembly and operation of the user interface invention with various software components. FIG. 1 describes the novel invention architecture that is incorporated by reference in the subsequent figures describing a preferred form of the invention.

The invention comprises a novel web portal that delivers diverse sources of content, systems and applications under one user unified interface for a particular enterprise. Referring further to FIG. 1, the elements of invention comprise the following:

A specific dash board appearing on the display element of a user's computer device at [100] is configurable by that specific user of the system within the enterprise. The specific user must first be enabled by the SSO/SAML manager of the enterprise [175]. The communication occurs at [180] when the specific user by logs into said specific user's account with the dash board device [100] and contacts the SSO/SAML manager of the enterprise [175]. It will be understood that such enabled access will be made with at least one but potentially, at different times, one of a plurality of computation devices utilizing the dash board [100] associated with a specific user account. In a preferred embodiment the computational device of the user interface [100] first communicates at [110] within the cloud computing environment [115] with the SaaS search utility at [155]. Such Unified Enterprise search utility [155] is configured to index all information internal and external to an enterprise. Such internal information indexing takes place at the Enterprise Utility Provider [165] and results in transmission to [170] and reception from [160] such information preferably via a cloud computing environment [115]. It will be obvious to one skilled in the art that the SSO/SAML manager of the enterprise [175] and the Enterprise Utility Provider [165] are part of and/or under the common control of the enterprise of the specific end user.

Referring now to FIG. 7, is an exemplary graphical user interface of the dash board home page display that appears on device [100] previously referenced in FIG. 1. The end user accesses the utilities of the dash board display of FIG. 7 utilizing a plurality of device element that may include, without limitation, keyboard, joy stick, computer 'mouse' or touch screen elements of device [100] previously referenced in FIG. 1. The User Dashboard Interface chosen is a preferred means that to enable invention's software algorithms to access the useful features of the invention. Custom browser configurations were made to the screen display shown in FIG. 7 to allow for a true single sign on process when permitted end users access the home URL from a computer bound to a corporate enterprise network. Further, permitted end user GPO's (Group Policies) are also configured for a browser on the corporate enterprise network to automatically go to the home page shown in FIG. 7. Tabs represented on the on top portion of FIG. 7 perform software permitted end users into other products, that are preferably accessed in the cloud computing environment of FIG. 1 and shown at [115] on FIG. 1.

Referring further to FIG. 1 is an exemplary element for external information indexing shown at a Blog software utility [120] which is remotely activated by the SaaS search utility at [155] through the cloud computing environment and in which a smart search function utilizing the Access Control Language (ACL) assigned to a file or folder is included in the index. Other such exemplary external indexing of information through external software utilities are shown on FIG. 1 at [125] for file management; at [130] for WIKI's; at [135] for Crowd Sourcing; at [140] for file transfer, and; at [145] for online meetings and conferencing. An important novelty of the invention is its ability to interchange functionally equivalent software platforms without disruption to the end user in the continuing use of the user interface device. For one skilled in the art, it will be obvious that a customization process for users search results can be functionally implemented for a unique user within the enterprise. Further, a Single Sign On (SSO) function utilizing a system of federated user access enabled through the enterprise directory, (AD, LDAP, etc) represents a novel improvement of the present invention.

Referring further to FIG. 1 and without limitation, the services and products of various software enterprise providers may be integrated by this invention to a unified user interface. Where software products are functionally equivalent to each other, a novel and useful feature of the invention is ability to replace or substitute such functional equivalent software products or services without disrupting the ongoing use of the invention by permitted end users. Without limitation and for reference and discussion throughout the present invention disclosure, such software enterprise offerings of products and services may include and may be designated in groupings as follows:

Software1—Dashboard, Intranet, Extranet, Portal, Social Media Monitoring & Widgets, SharePoint alternative;

Software2—WIKI workspace, Micro blogging (Twitter for the Enterprise) plus;

Software3 (Blogs)—Open Source blogging software hosted in the Software3 cloud;

Software4—Enterprise search, index everything search anything, and comparable software to Microsoft Fast, and/or Google;

Software5—Large File Transfer & Cloud File, comparable to box.net or yousendit.com;

Software6—Web meeting, Web conferencing, Video conferencing, Desktop sharing, comparable software to Live Meeting, Webex, Gotomeeting, or Adobe Connect, all of which are in the cloud computing environment and utilize a browser.

Referring further to FIG. 1, the present invention makes novel uses of 'cloud computing' [115] to integrate the multiple and diversely sourced software functions of the user interface. As used herein, 'Cloud computing' generally refers to wireless and remotely communicated instructions and data to computer processors and data storage devices that are highly distributed and capable of massive computational processing as compared to a dedicated finite computer processor network of a single enterprise. Such capabilities are particularly useful in social networking communication, information analysis and relational algorithms involving external communities. Referring further to FIG. 1, the SaaS search engine feature [155] will be understood to be an example of the Software4 functionality for enterprise search. This function is both central and novel to the present invention by encoding and enabling the simultaneous search of external content of the internet and internal content of the enterprise.

Figure 8A:
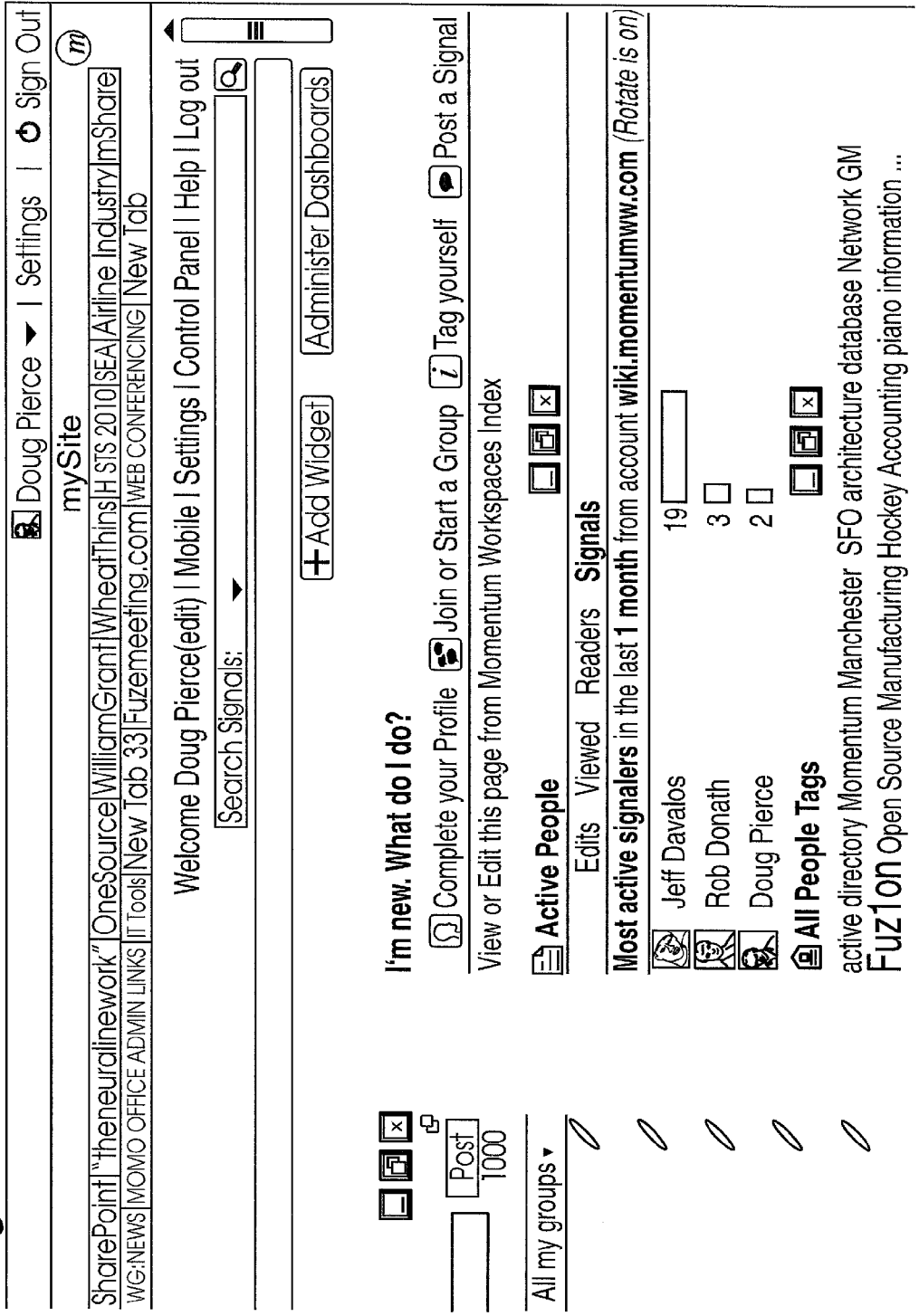
FIG. 8 provides an exemplary screen shot of a collaboration tab accessed through a user display interface.

Referring now to FIG. 8 is an exemplary screen shot of the invention's Collaboration Tab when accessed through the User Display Interface. In this example a permitted end user clicks on the collaboration tab and is taken directly into the collaboration product. The collaboration tab generates a novel screen display identifying the status of the permitted end user with activities in process with internal users of the enterprise and participants external to the enterprise that involve a plurality of independent software platforms that are accessed through the cloud computing environment. SSO happens in the background and is systemic. A particular novelty is the mean by which parts of the collaboration product can be blended with other parts of the invention's solutions. For example, the activity stream can be blended with news sites accesses from the dash board. It will be obvious to one skilled in the art that the screen shot of FIG. 8 is a different product screen display than the dash boarding product display referenced in FIG. 7.

Referring now to FIG. 9 is an exemplary screen shot of the invention's user interface display which demonstrates a blogging product which is accessed in through the cloud computing environment. The SSO is systemic such that the permitted end user, after clicking on the tab on top entitled "MY BLOGS", is taken directly into another unique product for blogging without a further sign in or validation being required as a condition of use. Referring back to FIG. 1, one skilled in the art will recognize that the screen shot of FIG. 9 is the functional element through which the User Display Interface [100] accesses at [105] the cloud computing environment [115] and is directed to the Blog utility [120]. Access to the Blog utility [120] is conditioned by the SaaS Search engine [155] communicating [110] via the cloud computing environment [115] with the User Display Interface [100].

Figure 11A:
FIG. 11 provides an exemplary screen shot of enterprise news blog incorporated on the home page in a "widget" provided on the user display interface.

Referring now to FIG. 10, is an exemplary screen shot of a preferred embodiment of the invention which displays the enterprise's corporate news site as a blog inside the blogging platform. Referring now to FIG. 11 is an exemplary screen shot of a further preferred embodiment of the invention where said corporate news site blog (indicated by the arrow which is not part of the screen shot display) is incorporated into an end user's exemplary home page screen first described in FIG. 7.

Referring now to FIG. 12 is an exemplary screen shot demonstrating an Enterprise Search utility chosen to provide search across the entire data set of an enterprise organization. Again permitted users of the solution click on the navigation tab of the screen display for search and are taken into another unique SaaS product and federated into the application systemically via the SSO utility. The Enterprise Search utility is configured to index and represent results securely based on the permitted end user credentials which are inputs in the SSO certificate. The 3 overlay arrows of FIG. 3 (which are not part of the actual screen display of FIG. 12) represent 3 unique data types all provided under the search result. An interesting novelty is that this invention embodiment can provide search results both internal to an enterprise's internal computational hardware and databases devices and external non-enterprise controlled databases available through the cloud computing environment. Therefore the invention can simultaneously index content and provide unique and secure result sets on data both on the enterprise WAN and data derived from the cloud computing environment. Such custom search API's are configured to provide for integrated, enterprise search that are further predicated on the SSO credentials of the permitted end user.

Referring now to FIG. 13 is an exemplary screen shot providing a further novelty of the invention involving a unique SaaS product blended into a solution to provide large file transfer, which include cloud computing environment files. Access to this product is via tab navigation in the SaaS dash board interface and is federated through the SSO utility.

Figure 14A:
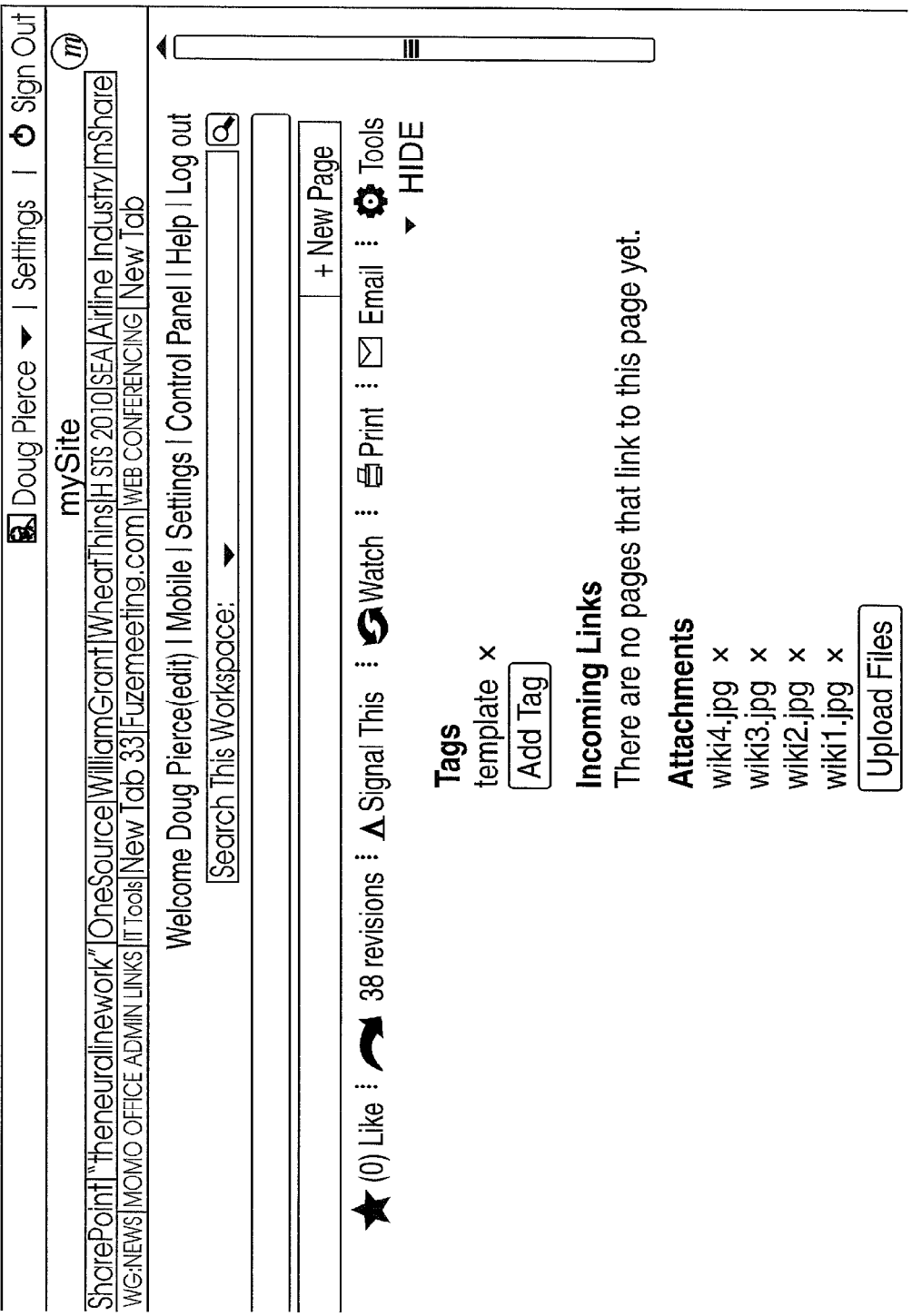
FIG. 14 provides an exemplary screen shot of an enterprise SaaS product providing "partner videos" inside of cloud files provided by a unique SaaS provider.

Referring now to FIG. 14 is an exemplary screen shot of the enterprise SaaS utility providing "Partner Videos" inside of cloud files through a unique SaaS Sourced Provider. Note that in FIG. 14 the invention has taken content inside of cloud files previously shown in FIG. 13 and blended it to be a collaboration feature of FIG. 14. Specifically, the "Partner Videos" inside of the cloud files are presented and fully federated inside of the collaboration platform. Also note that the cloud files solution is provided by a unique SaaS provider and the collaboration solution is provided by yet another unique SaaS provider.

Referring now to FIG. 15 is an exemplary screen shot of a new tab in the User Dashboard Interface containing work from a collaboration solution and cloud files sourced from a cloud file solution which demonstrates the multi platform blending utility of the invention. This feature generates a new tab in dash board, with work space from the collaboration solution inside, with cloud files from the cloud files solution inside. All such solutions are fully federated, and permitted end users can seamlessly click through from a solution onto the other solution. Further, the entire solution works as one integrated cohesive solution.

FIG. 1, taken as a whole, demonstrates various utilities accessed by users of an enterprise for which the present invention was created and implemented. It will be understood to one experienced in the art that the elements of FIG. 1 can be displayed on an electronic computing or telecommunications device through a visual screen. Specifically, FIGS. 7 through 15 inclusively disclose various user display interfaces that are generated by the invention to implement its various novelties. It will be noted that all the functionality of the invention's software architecture is accessed through tabs or icons visually present on the dashboard display, including without limitation the tabs and icons represented in FIGS. 7 through 15 inclusively. It will be further understood that a further iteration of the user interface display may show an expanded view of a particular tab that displays particular enterprise software configured to that particular enterprise. It will be further understood that the exemplary form of settings available to a particular user within a particular enterprise may be customized to use a particular user interface to access particular enterprise software. Without limitation, such 'brand tabs' and user interface displays may include those that permit participation in and monitoring of social media software functions.

Without limitation, an exemplary display of the invention that may be accessed by the user interface may display WIKI's.

Without limitation, an exemplary display of the invention that may be accessed by the user interface may display Blogs.

Without limitation, an exemplary display of the invention that may be accessed by the user interface may display software Tools.

Without limitation, an exemplary display of the invention that may be accessed by the user interface may display File storage and retrieval from Cloud Computing.

Without limitation, an exemplary display of the invention that may be accessed by the user interface may display on line Meeting software.

Without limitation, an exemplary display of the invention that may be accessed by the user interface may display the Search engine functions. This display provides search functionality that is both external and internal to the enterprise. This functionality and the means to accomplish it are further displayed in FIG. 2 and further explained below.

Referring now to FIG. 2 is a flowchart illustrating the search engine processes of the present invention as they relate to computational and data storage devices. In an exemplary form of the invention, at [220] an end user communicating through their personal user interface display engages the primary search interface at [240]. The primary search interface operates with the Enterprise Search Cloud processes at [245]. The Enterprise Search Cloud [245] is in concurrent communication with various hardware sites such as an Atlanta site shown at [200] and in communication at [210] with the Enterprise Search Cloud at [235]. In another embodiment, systems at St. Louis and Cincinnati at [205] are in concurrent communication at [215] with the Enterprise Search Cloud [245]. In the particular embodiment of FIG. 2, St. Louis is the onsite hardware host for the end user [220] for which credentials authorizing Enterprise Search Cloud [245] use are confirmed at [240].

In the current embodiment shown in FIG. 2, a further JAVA connector communication is shown at [230] and connected to the Enterprise Search Cloud at [232]. A Blog JAVA Connector at [250] connects with the system at [232] while concurrently engaging the Blogging Engine Environment at [260]. In a still further embodiment shown in FIG. 2, a WIKI JAVA Connector at [255] connects with the system at [232] while concurrently connected to the WIKI Cloud environment at [265].

As further illustrated in FIG. 2, the present invention assembles the enterprise search platform element for utilizing common search practices that index data from diverse and disparate data sets and systems through the dashboard function of the user interface. The present invention is novel in the way the enterprise search platform of this engine have been uniquely designed and assembled to connect the data elements in systems that are, in the prior art, only searchable within the closed system of a particular enterprise. Instead the present invention aggregates and includes all data in all systems to be delivered in one unified search result. The invention uses code that has been developed, (JAVA and PHP being representative software languages of said code) to facilitate integration of heterogeneous data and user environments to facilitate invention's presentation of unified search results.

FIG. 3 is an exemplary embodiment of the process elements of the present invention, and includes those process elements for which FIG. 2 is an exemplary configuration of the present invention. Referring now to FIG. 3, the process at [300] configures the computational device's operating system and browser settings to utilize the present invention. Such configuration and settings at [300] permits the end user through the end user interface to be in communication with the front end of the Enterprise Search utility [305]. Access to the process at [305] is predicated on authentication of the service setting shown at [325]. Such authentication service setting [325] operates within the enterprise's security firewall [330] for which an end user is a member or permitted third party user. Successful authentication permits the Enterprise Search Front End to interact with the Enterprise Search Content Index at [310]. A further iteration of the Enterprise Search Content Index is shown at [311] which one skilled in the prior art will understand to be the identical process element at [310]. Within the Enterprise Search Content Index [311] are the connector utilities processes which are shown at [350]. The Enterprise Search Content Index [311] mediates service user credential requests at [340] to permit or deny or limit access to enterprise applications [315], network file sharing [320] or various other enterprise internal services [322]. The process elements shown at [315], [320] and [322] respectively reside within the enterprise firewall [330]. The Enterprise Search Content Index [311] further mediates service user credential requests at [345] to access or deny or limit use of those utilities residing in the Cloud Computing Environment at [335] through the end user interface. It will be understood by one skilled in the prior art that informational exchanges between Enterprise Search Content Index [311] and processes residing within the Enterprise firewall [330] are bi-directional. It will be further understood by one skilled in the prior art that informational exchanges between Enterprise Search Content Index [311] and processes residing within the Cloud Computing Environment [335] are bi-directional.

FIG. 4 is a further description of the process element shown at [305] of FIG. 3 of the present invention. Referring now to FIG. 4 at [400] there is an identification of multiple menus for selections of operating system (OS) and browser settings respectively. Such settings are interdependent upon service providers as shown at [410]. Further, such settings are interdependent on directory services shown at [420]. Still further, such menus at [400] may consider a plurality of devices provided by a respective plurality of manufacturers to further determine the menu elements of the computer settings.

FIG. 5 is a representation of exemplary applications that are supported and implemented into the present invention. Referring now to FIG. 5, at [500] a series of supported applications is displayed. Referring now to [510] of FIG. 5 is a matrix of end user interface tabs reflecting the particular applications that support them.

Without limitation, the process disclosed in the FIGS. 1 through 5 inclusively of the present invention may be implemented by users within an enterprise by use of the following steps:

Step 1: Software1 SSO Logon Process

In a preferred embodiment, a Web searcher receives web page request, which is checked for session information in the form of a cookie. If a session cookie is not present, the user is redirected to an Identity Provider for authentication. Once the user is authenticated, the user's browser will pass a token and the assertion information back to the Web searcher application. The value of the EMAIL ADDRESS assertion field is used to check the Software1 database to see if the user already exists. If the user does not exist, a new user account is created based on a template. The username field of the Software1 database will be derived from the characters preceding the "@" in the email address. If the user does exist, the FIRST NAME and LAST NAME fields of the assertion are synchronized to the Software1 database and placed within the "Full Name" field. At this point a session is created and the user's browser is directed to store a session cookie. User is redirected to their Software1 home page. Management occurs through SSO using the invention's selected AD service account whose name conforms to the format "Software1.service".

Step 2: Software2 (Wikis) SSO Logon Process

In a preferred embodiment, the site is using HTTPS for web content and federation. HTTP traffic is redirected to HTTPS which is helpful if user does not know to use HTTPS. Once the user is authenticated, the user's browser will pass a token and the assertion information back to the Web searcher application. The value of the MAIL assertion field is used to check the Software2 database to see if the user already exists. A user is considered to exist if either the Software2 "username" or "email address" fields match the MAIL assertion field. If the user does not exist, a new user account is created based on a template. The username and email address fields of the Software2 database will be derived from the value in the MAIL assertion field. If the user does exist, the FIRST NAME and LAST NAME fields of the assertion are synchronized to the Software2 database and placed within the "First name" and "Last name" fields. Service account will be an enterprise Active Directory service account.

In a preferred embodiment of the invention, the service account will be used to create and administer Wikis that are normal user accounts are not admins within the enterprise. The credentials for this service account are embedded within a Java program running on an enterprise internet account address. Management account has read/write access to all Wikis and is used to manage Wikis and to push data to the Software4 search database. Because Software2 stores files as flat files and does not use a database, a database account cannot be used for management.

Step 3: Blogs SSO Logon Process

In a preferred embodiment, a Web searcher receives a web page request, which is checked for session information in the form of http header variables. If session information is not present, the requesting user is redirected to Identity Provider for authentication. For example assume there are no admin accounts for Moveable Type. Management is therefore accomplished through a database interface.

Step 4: Software4 (Search) SSO Logon Process

In a preferred embodiment of the invention, management accounts are provided by Software4 and access through custom non-SSO URLs.

Step 5: Software6 SSO Logon Process

In a preferred embodiment, attribute requirements—ObjectGUID—are to be used as unique identifiers for each user and defaults to value in OBJECTGUID attribute in HTTP header as follows:
  a. User Name (defaults to value in USERNAME attribute in HTTP header)
  b. Password (defaults to obfuscation by Software6 and is used to preserve database integrity)
  c. Email Address (defaults to value in MAIL attribute in HTTP header)
  d. Max Attendees (defaults to same as account maximum)
  e. Hide Video Settings (default: false)
  f. Can Record? (default: true)
  g. Recording Limit (default: 5242,880 KB)
  h. Teleconferencing Default Call In Number: (defaults to blank)
  i. Teleconferencing Default Moderator Code: (defaults to blank)
  j. Teleconferencing Default Attendee Code: (defaults to blank)\

In the foregoing description, and by way of illustration, the enterprise and Software1 user accounts can be related through certain attributes. For example, four attributes may be passed to Software1 in the SAML assertion:
  1. saMAccountName—Firstname.lastname (This field is a unique identifier in Software1 database)
  2. mail—Primary email address (This field is a unique identifier in Software1 database) (This field is used to determine if an account already exists)
  3. givenName—First name
  4. sn—Last name In this configuration of the invention, Software1 stores information in an additional field, "Full Name" that contains the concatenated value of the FIRSTNAME and LASTNAME fields that are sent in the assertion. The "Full Name" field is what is used to display the user's name on the profile section of their Software1 home page. There are no passwords stored in the Software1 database so no enterprise employee or permitted user can logon except through the SSO process. Each software component accessed through the user interface use attributes analogous to the preceding description.

It should be noted that in addition to portal sites utilizing cloud computing processes, the present invention includes tab icons for accessing internal enterprise software systems and databases. While these may be based in cloud computing, they may also be tied directly to computer processors and computing devices discrete to the enterprise itself. The portal security system employs security firewalls to maintain restricted access to these systems and files. The security firewall prevents external community access and may also be restricted with respects to the enterprise users on a 'need to know' basis.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. An enterprise user interface system comprising;
a digital electronic device in communication with a screen device, said digital electronic device providing:
a user interface configured as a dashboard digital display;
said user interface having:
at least one third party functional software component for a third party functional software located on a device remote from said digital electronic device, said third party functional software component running within said user interface;
at least one third party software social networking component for a third party social networking platform, said third party social networking component enabling social networking communication with a third party user, said communication occurring via said user interface; and
at least one enterprise level software data storage component for an enterprise level data storage system, data in said enterprise level data storage system being accessible through said user interface;
a software based security component:
authenticating a user as being authorized to access said user interface; and
once said user has been authenticated, allowing said authenticated user to run said functional software component, communicate via said social networking component, and access data in said storage system from said user interface without further authentication; and
a software based search engine component configured for:
searching material run on said functional software component, communicated on said social networking software component, and in said storage system simultaneously with a single search string in said user interface; and
returning all matches from said searching in a single display in said dashboard digital display;
wherein said software systems are remotely accessed and enabled through cloud computing.

2. The system of claim 1 wherein said system utilizes a uniform file configuration and management with respects to all software systems accessed by the user interface.

3. The system of claim 2 wherein said uniform files are stored and accessed using cloud computing.

4. The system of claim 1 wherein said user interface is assembled by computer code to allow software to be accessed through the user interface.

5. The system of claim 4 wherein said computer code is remotely accessed from an information technology administrator entity.

6. The system of claim 4 wherein said user interface is designed using user interface specifications furnished by an enterprise for said enterprise's authenticated users.

7. The system of claim 6 wherein said computer code is remotely accessed from an information technology administrator entity.

8. The system of claim 6 wherein said specifications include at least one specification furnished by a permitted member to design a compatible enterprise user interface that is specific to said permitted member.

9. The system of claim 6 wherein said computer code resides on said digital electronic device.

10. The system of claim 1 wherein said user interface is accessed through an enterprise's web site.

* * * * *